(12) United States Patent
Shaked et al.

(10) Patent No.: US 11,924,009 B1
(45) Date of Patent: Mar. 5, 2024

(54) FREQUENCY DEPENDENT RESIDUAL SIDE BAND CORRECTION

(71) Applicant: QUALCOMM Incorporated, San Diego, CA (US)

(72) Inventors: Ronen Shaked, Kfar Saba (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/930,403

(22) Filed: Sep. 7, 2022

(51) Int. Cl.
*H04L 27/04* (2006.01)
*H04L 5/00* (2006.01)
*H04L 25/03* (2006.01)

(52) U.S. Cl.
CPC .......... *H04L 27/04* (2013.01); *H04L 5/0098* (2013.01); *H04L 25/03006* (2013.01); *H04L 2025/03815* (2013.01)

(58) Field of Classification Search
CPC . H04L 27/04; H04L 5/0098; H04L 25/03006; H04L 2025/03815
See application file for complete search history.

(56) References Cited

U.S. PATENT DOCUMENTS

| | | | | |
|---|---|---|---|---|
| 7,633,994 B2* | 12/2009 | Forenza | ............... | H04L 1/0057 375/267 |
| 10,116,485 B1* | 10/2018 | Liu | ..................... | H04B 17/354 |
| 2020/0169434 A1* | 5/2020 | Tangudu | ............... | H04B 1/525 |

FOREIGN PATENT DOCUMENTS

| | | | | |
|---|---|---|---|---|
| EP | 2228959 A2 * | 9/2010 | ............ | B41J 2/505 |
| EP | 2228959 B1 | 6/2020 | | |
| WO | WO-2007127450 A2 * | 11/2007 | .......... | H04B 7/0691 |
| WO | WO-2021212004 A1 | 10/2021 | | |

OTHER PUBLICATIONS

International Search Report and Written Opinion—PCT/US2023/029027—ISA/EPO—dated Nov. 17, 2023.
Manasseh E., et al., "Training Symbol Design for Channel Estimation and IQ Imbalance Compensation in OFDM Systems", IEICE Transactions on Fundamentals of Electronics, Communications and Computer Sciences, Engineering Sciences Society, Tokyo, JP, vol. E95-A, No. 11, Nov. 1, 2012 , pp. 1963-1970, XP001579822, figure 1, Section 3.1.

(Continued)

*Primary Examiner* — Jean B Corrielus
(74) *Attorney, Agent, or Firm* — Procopio, Cory, Hargreaves & Savitch

(57) ABSTRACT

A network node may transmit a training signal for a UE on a plurality of sub-carriers, the training signal transmitted via multiple IQ modulators and multiple RF antenna panels and receive a feedback associated with an FDRSB based on the training signal. The network node may apply an FDRSB correction filter to at least one signal to be transmitted to the UE, and the FDRSB correction filter may be based on the feedback received from the UE. The training signal may include at least one tone transmitted on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal.

30 Claims, 14 Drawing Sheets

(56) References Cited

OTHER PUBLICATIONS

Ozdemir O., et al., "Modelling and Compensation of Frequency-dependent I/Q Imbalance in Multiple Beamforming OFDM Transceivers", The 11th International Conference on Information Sciences, Signal Processing and their Applications (ISSPA): Special Sessions, IEEE, Jul. 2, 2012, pp. 1359-1364, XP032241602, Sections 2, 3 and 4.
Xiu-Rong M., et al., "Joint Estimation and Compensation of Transceiver IQ Imbalance for Pdm Co-Ofdm System", Optoelectronics Letters, vol. 17, No. 3, Mar. 15, 2021, pp. 144-148, XP037397695, figure 2 p. 1.

\* cited by examiner

FREQUENCY DEPENDENT RESIDUAL SIDE BAND CORRECTION

TECHNICAL FIELD

The present disclosure relates generally to communication systems, and more particularly, to a wireless communication including a frequency dependent residual side band (FDRSB) correction.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus includes a network node configured to transmit a training signal for a user equipment (UE) on a plurality of sub-carriers, the training signal transmitted via multiple in-phase (I) and quadrature (Q) (IQ) modulators and multiple RF antenna panels, receive a feedback associated with a frequency domain residual sideband (FDRSB) based on the training signal, and apply an FDRSB correction filter to at least one signal to be transmitted to the UE, the FDRSB correction filter based on the feedback received from the UE.

In another aspect of the disclosure, a method, a computer-readable medium, and an apparatus are provided. The apparatus includes a user equipment (UE) configured to receive a training signal from a network node on a plurality of sub-carriers from multiple IQ modulators and multiple RF antenna panels, and transmit a feedback associated with a FDRSB based on the training signal to the network node, where at least one tone of the training signal is received on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
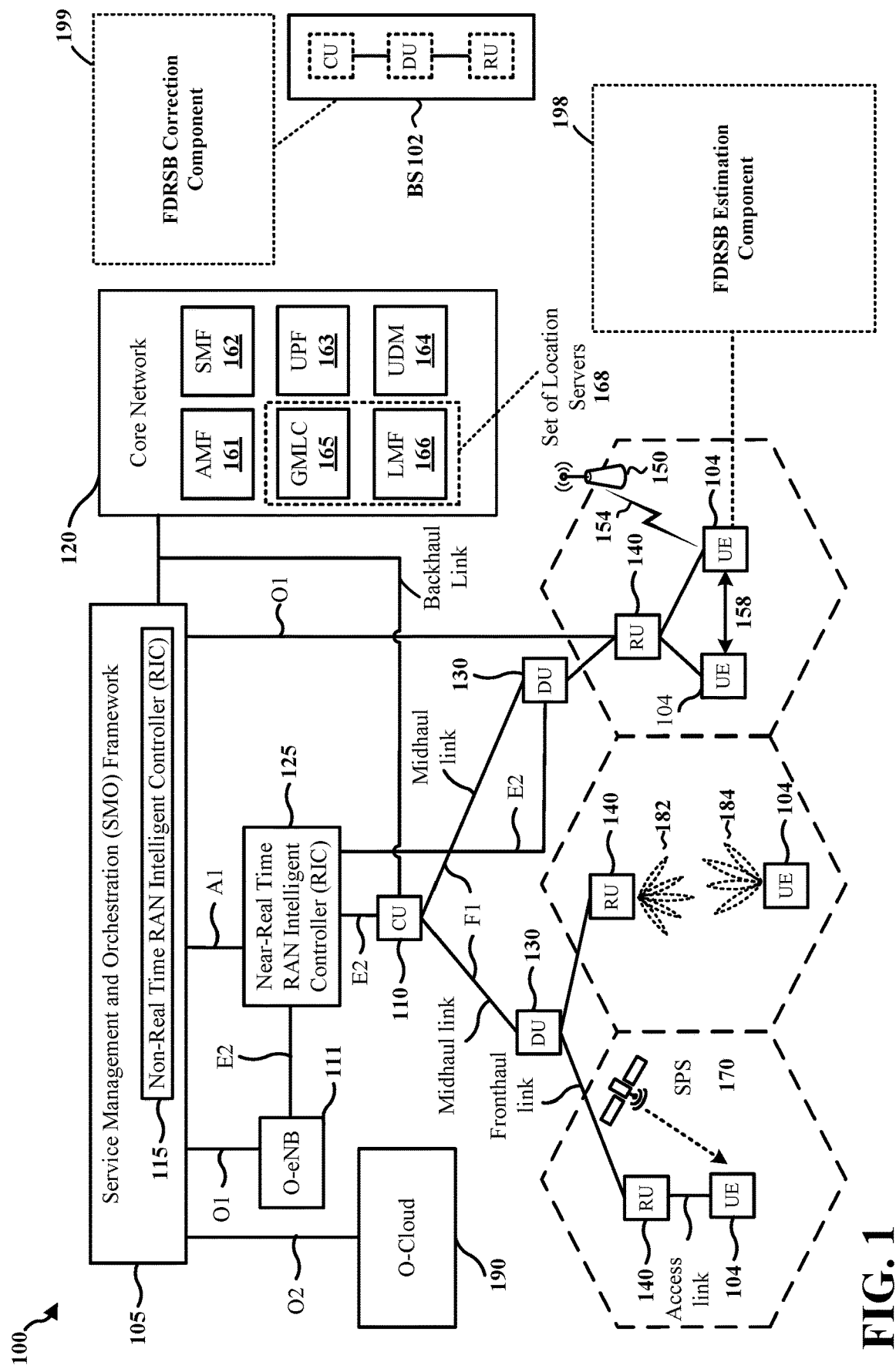
FIG. 1 is a diagram illustrating an example of a wireless communications system and an access network.

When a network node (e.g., a base station such as a gNB) is configured with multiple IQ modulators and each IQ modulator may experience an IQ mismatch (e.g., FDRSB impairment components), and FDRSB impairment. Cancelation of the IQ mismatch or FDRSB improves link performance. An estimation of the FDRSB can add complexity for the network node, e.g., which increases with the number of antennas and IQ modulators of the network node. Aspects of the current disclosure provide for a more efficient FDRSB correction, through the network node transmitting a training signal for a user equipment (UE) to measure or estimate a composite FDRSB impairment component. The UE provides the network node with information based on the estimate, which allows for a reduction of complexity at the network node to cancel FDRSB and improve link performance between the network node and the UE.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a FDRSB estimation component 198 configured to receive a training signal from a network node on a plurality of sub-carriers from multiple IQ modulators and multiple RF antenna panels, and transmit a feedback associated with a FDRSB based on the training signal to the network node, where at least one tone of the training signal is received on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal. In certain aspects, the base station 102 may include an FDRSB correction component 199 configured to transmit a training signal for a UE on a plurality of sub-carriers, the training signal transmitted via multiple IQ modulators and multiple RF antenna panels, receive a feedback associated with an FDRSB based on the training signal, and apply an FDRSB correction filter to at least one signal to be transmitted to the UE, the FDRSB correction filter based on the feedback received from the UE. Although the following description may be focused on 5G NR, the concepts described herein may be applicable to other similar areas, such as LTE, LTE-A, CDMA, GSM, and other wireless technologies.

Figure 2:
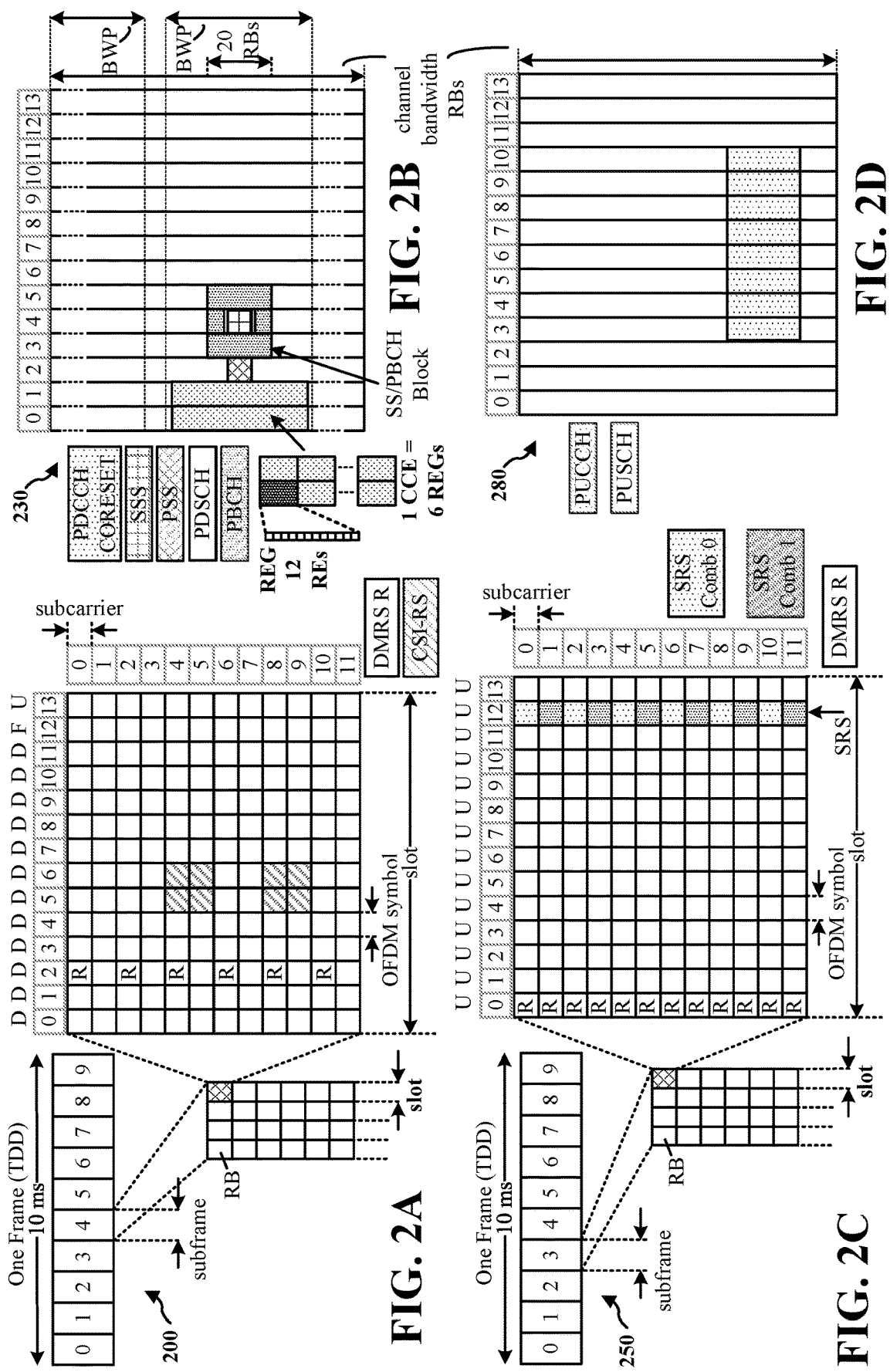
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS (see Table 1).

TABLE 1

Numerology, SCS, and CP

| μ | SCS $\Delta f = 2^\mu \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology ii, there are 14 symbols/slot and $2^\mu$ slots/subframe. The subcarrier spacing may be equal to $2^\mu*$kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
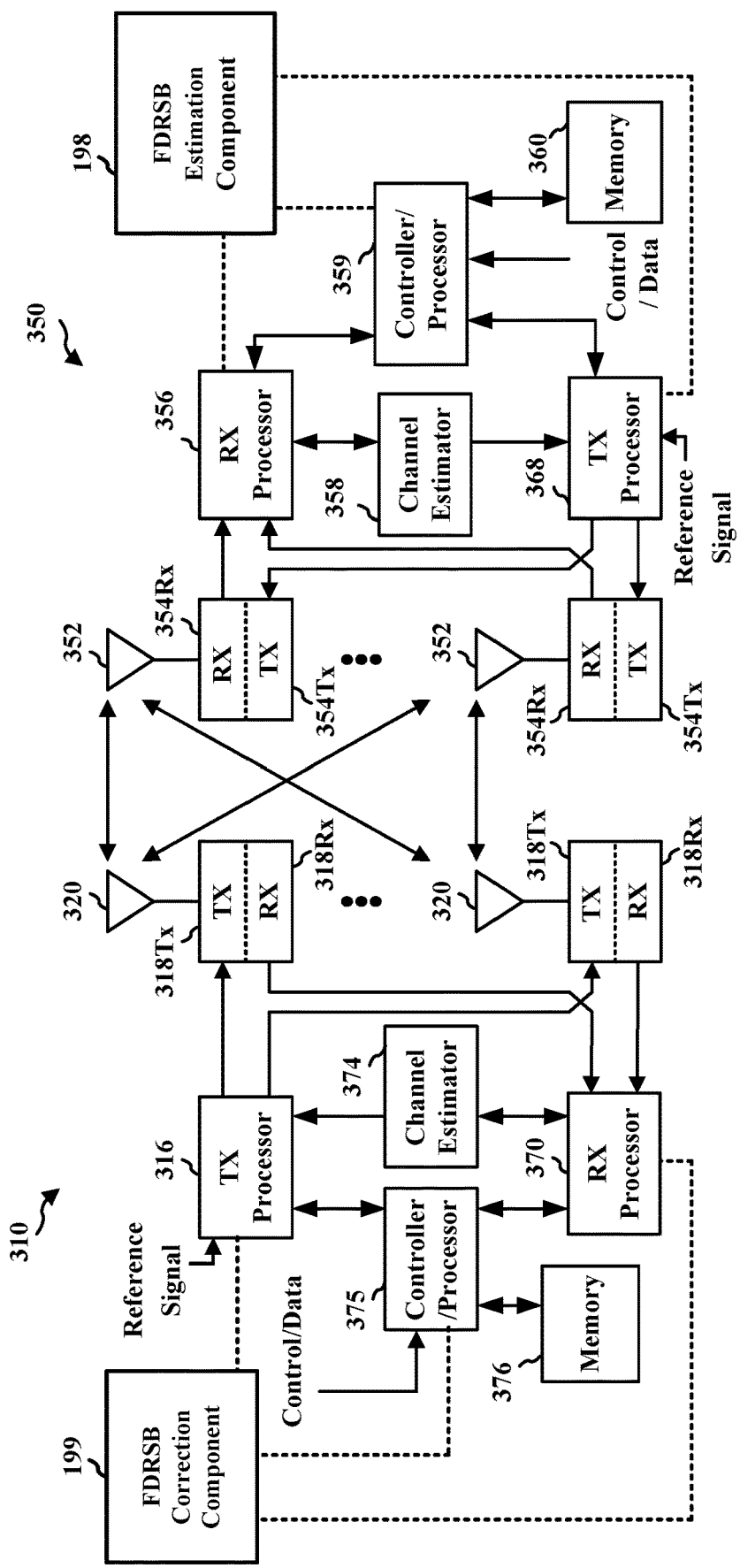
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the FDRSB estimation component 198 of FIG. 1. At least one of the TX processor 316, the RX processor 370, and the controller/processor 375 may be configured to perform aspects in connection with the FDRSB correction component 199 of FIG. 1.

In some aspects a network node (e.g., a base station such as a gNB) may use one or more antenna panels or remote radio heads (RRHs) including a plurality of antennas for a beam forming procedure. Aspects of beamforming are described in connection with 182 and 184 in FIG. 1. The plurality of antennas may be associated with a plurality of in-phase (I) and quadrature (Q) (IQ) modulators. The signal to be transmitted to a UE may be modulated using the plurality of IQ modulators, and the IQ modulated signal may be transmitted to the UE using the plurality of antennas.

In some aspects, a frequency domain residual sideband (FDRSB) impairment may be one of a physical layer (PHY) impairment that may be caused by the IQ mismatch of the plurality of the IQ modulators. That is, the IQ mismatch that may be referred to as the FDRSB may be an inherent impairment of the IQ modulator. Here, the IQ mismatch may be a frequency dependent impairment, e.g., varying based on the frequency of a signal. If the FDRSB is left uncancelled or untreated, the FDRSB may cause noise and limit the link performance between the network node and the UE.

The network node may use many antennas (e.g., massive MIMO) connected to the plurality of IQ modulators. In one aspect, the network node may be configured to estimate and mitigate the FDRSB. The network node may be configured with dedicated hardware for the FDRSB estimation and mitigation, which may include an RF feedback chain per each IQ modulator of the plurality of IQ modulators. The dedicated hardware may be configured to sample the signal (e.g., analog to digital converter (ADC)) and run the FDRSB estimation. Including a dedicated hardware may increase the complexity and cost of the network node.

Furthermore, the network node may not estimate a composite FDRSB because the network node does not have knowledge of the channel transfer function as observed at the UE. That is, the network node may be configured to estimate and mitigate the FDRSB, yet may not support an estimation of the composite FDRSB measured at the UE.

Aspects presented herein provide for an improved procedure in which the network node sends a training signal to the UE, and the UE estimates the FDRSB correction for the composite of all Tx chains and provides information to the network node. The UE may transmit a feedback of the FDRSB correction to the network node over the air (OTA) to the network node. Using the training signal may significantly reduce the cost and complexity of the network node to improve link performance through the FDRSB suppression.

In some aspects, a training signal may be configured for the network node and the UE for the estimation of the composite FDRSB. The estimation may be run on the UE side. That is, the network node and the UE may be configured to estimate and cancel the composite FDRSB using a training signal. In some example, the estimation of the composite FDRSB using the training signal may have a low complexity and relatively faster processing speed.

In one aspect, the training signal for the UE and the network node to estimate and cancel the network node's Tx FDRSB may be configured to reduce the complexity of the UE's procedure in estimating the network node FDRSB. That is, the training signal may be designed to capture the whole wide-band FDRSB and enable a relatively simple OTA feedback process of the FDRSB correction filter to the network node.

In another aspect the network node may inform the UE of the slot at which the training symbol(s) may be transmitted. The term "training signal" is merely an example of a name that may be used to refer to the signal for FDRSB estimation at the UE. The signal may also be referred to by other names. That is, the network node may transmit timing information indicating when the training signal is transmitted for the UE. For example, the timing information may indicate a slot number or at least one symbol number at which the network node will transmit the training signal for the UE. The UE may estimate the FDRSB correction filter based on the slot at which the training symbol(s) is transmitted and feedback (e.g., transmit) the calculated or estimated FDRSB correction filter to the network node in response to the training symbol(s).

The FDRSB provided over the entire bandwidth may be captured by allocating a single symbol for the training signal. That is, the training signal may be provided within a symbol to capture the FDRSB over the entire bandwidth. More than one symbol of training signal may be provided to improve the processing gain.

In some aspects, the process of cancelling the FDRSB may include the network node being assisted with information from one UE or multiple UEs to achieve (e.g., determine and apply) the FDRSB correction filters.

The network node may decide a periodicity at which an FDRSB estimation is requested from the UE. That is, the FDRSB estimation may be performed at certain periodicity, and the network node may configure the periodicity of the FDRSB estimation.

The network node may decide a width of the FDRSB training signal in frequency based on the operated BW of the network node. That is, if the network node is operating with a narrower BW, the network node may configure the width of the FDRSB training signal to improve the estimation accuracy of the FDRSB correction. For example, if the operating bandwidth is narrower, then the base station or network node can configure a narrower width of frequency resources for the FDRSB training signal. The narrower FDRSB training signal may provide a higher received SNR (e.g., over the training signal), because the network node transmit power is spread over a narrower width of frequency resources. Similarly, if the operating bandwidth is wider, the FDRSB training signal may user a wider set of frequency resources.

In wireless communication in a sub-tera Hz (THz) frequency range, the network node may be configured with a large number of Tx chains to form a narrow beam, which may compensate for the path loss (e.g., which may be due to a high carrier frequency). Therefore, the correction of FDRSB for these multiple chains may be provided to reduce the noise caused by the FDRSB.

The UE may estimate the composite FDRSB (e.g., a mixed measurement of multiple FDRSB elements from plurality of Tx chains) and provide the estimate to the network node, which enables a reduction in the dimension of estimating/correcting the FDRSB at the network node compared to performing the estimation and correction per each Tx chain.

The UE may estimate the composite FDRSB, and the estimation/correction may be dependent on the precoder or the beamformer used for the training signal, the estimation of the composite FDRSB may be updated or reinitiated in response to a precoder change, e.g., each time the precoder changes.

Figure 4:
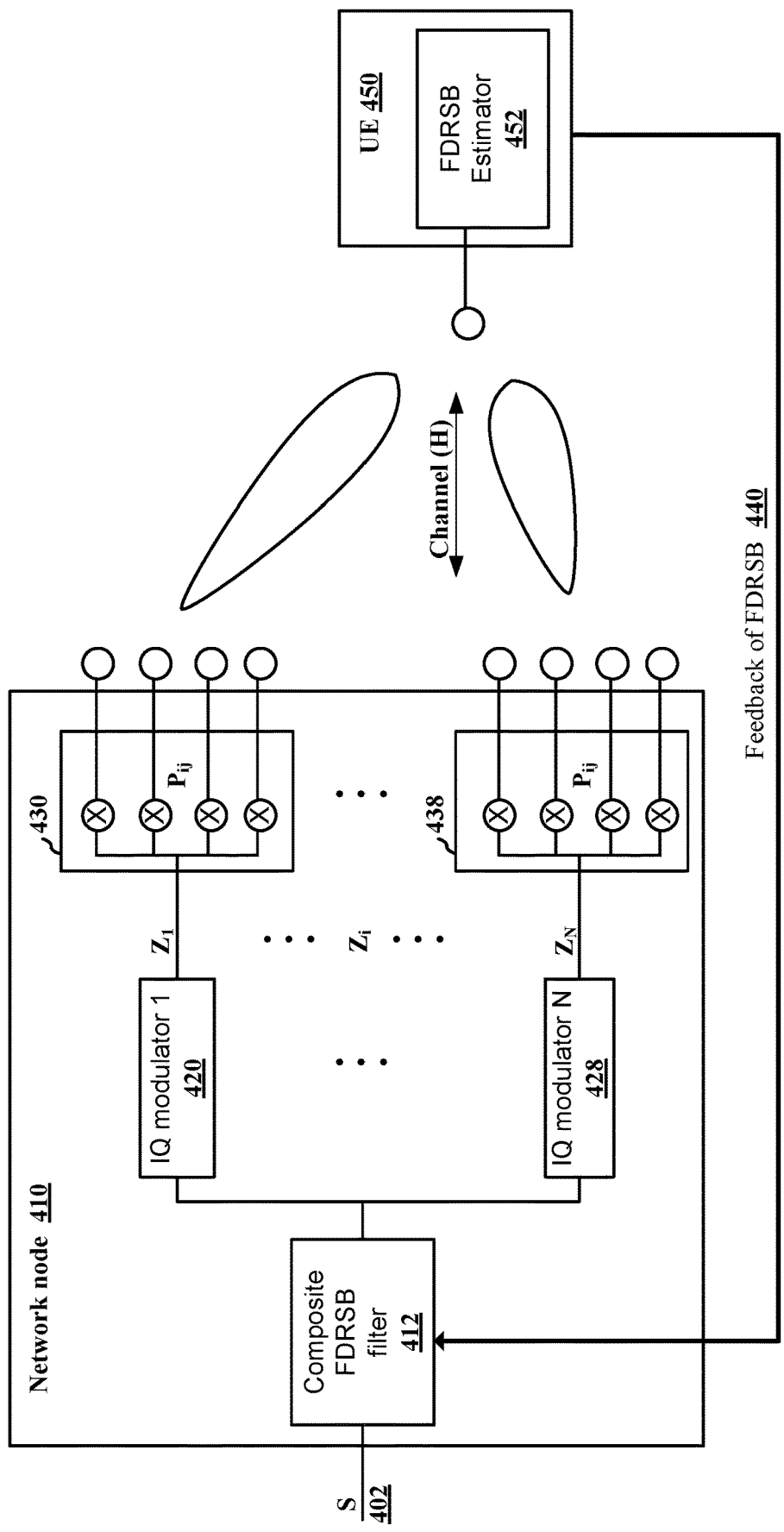
FIG. 4 illustrates an example of composite frequency domain residual sideband (FDRSB) estimation and cancellation.

FIG. 4 illustrates an example 400 of the composite FDRSB estimation and cancellation for wireless communication between a network node 410 and a UE 450. The network node 410 may be a base station 102 or a component of a base station such as one or more of a CU 110, a DU 130, or an RU 140. The network node 410 may include a composite FDRSB filter 412, a plurality of IQ modulators, including a first IQ modulator 420 and N$^{th}$ IQ modulator 428, and a plurality of antenna panels or antenna components, including a first antenna panel 430 and N$^{th}$ antenna panel 438. The plurality of antenna panels may include multiple RF panels/RRH units, for example. As an example, the first antenna panel 430 may include L antennas, and the N$^{th}$ antenna panel may include L antennas.

Before the composite FDRSB filter is estimated between the network node 410 and the UE 450, the network node may transmit a training signal S 402 to the UE 450 over a wireless link. The link may be configured on the network node Tx side of the multiple RF panels/RRH units which may generate beam forming using the coefficients $P_{ij}$. For example, each of the plurality of antenna panels including the first antenna panel 430 and the N$^{th}$ antenna panel 438 of the network node 410 may be configured with the coefficients $P_{ij}$ to generate the beam forming to establish the wireless link with the UE 450. The multiple RF panels/RRH units may be fed with N separate IQ modulators (e.g., the first IQ modulator 420 to the N$^{th}$ IQ modulator 428). Each of the N IQ modulators may be impaired with different FDRSB s. That is, the first IQ modulator 420 may experience a first FDRSB and the N$^{th}$ IQ modulator 428 may experience an N$^{th}$ FDRSB.

The training signal S may be applied to the N IQ modulators, where an i$^{th}$ IQ modulator may be associated with an i$^{th}$ FDRSB impairment component. Accordingly, the IQ modulated training signal may be represented as: $Z_i[k]=S[k]+F_i[k]\cdot S^*[-k]$, where S[k] may refer to the training signal in the FD domain and the $F_i[k]$ may refer to the FDRSB impairment component of the i$^{th}$ modulator, and k may represent the index of a sub-carrier. As an example, if an IFFT size is 4096, then k may take an integer value between 0 and 4095, e.g., $\{0, 1, \ldots, 4095\}$.

The IQ modulated training signal $\Sigma_i Z_i[k]$ may be transmitted via the plurality of antenna panels to the UE 450. The signal received on the UE side may include $Z_i[k]$ after passing the beam-former and received on the channel H, and the received signal may be represented as $Y[k]=\Sigma_i Z_i[k]\Sigma_j P_{ij}[k]H_{ij}[k]=\Sigma_i Z_i[k]G_i[k]$. Here, the $G_i[k]=\Sigma_j P_{ij}[k]H_{ij}[k]$ may represent the beam-former and the channel H. Accordingly, the received signal may be further represented as:

$$Y[k]=\Sigma_i(S[k]+F_i[k]\cdot S^*[-k])G_i[k]=S[k]\Sigma_i G_i[k]+S^*[-k]\Sigma_i G_i[k]F_i[k].$$

Here, $\Sigma_i G_i[k]$ may represent the main channel which may be referred to as a $C_{main}[k]$, and $\Sigma_i G_i[k] F_i[k]$ may represent the FDRSB channel which may be referred to as a $C_{FDRSB}[k]$.

The UE 450 may include an FDRSB estimator 452, which may include an equalizer to cancel the main channel $C_{main}[k]$, which is an equalized signal $Y_{out}[k]$ at the UE that may be represented as:

$$Y_{out}[k]=C_{main}^{-1}[k]\cdot Y[k]=S[k]+S^*[-k]\cdot C_{FDRSB}[k]$$
$$C_{main}^{-1}[k]$$

$$Y_{out}[k]=C_{main}^{-1}[k]\cdot Y[k]=S[k]+S^*[-k]\cdot C_{FDRSB}[k]$$
$$C_{main}^{-1}[k]$$

Here, $S^*[-k]\cdot C_{FDRSB}[k]C_{main}^{-1}[k]$ may represent the composite FDRSB component observed at the UE, and the $C_{FDRSB}[k]C_{main}^{-1}[k]$ may be referred to as $C_{FDRSB.post.eq}[k]$. Accordingly, the equalized signal $Y_{out}[k]$ at the UE may be represented as:

$$Y_{out}[k]=S[k]+S^*[-k]C_{FDRSB.post.eq}[k]$$

In some aspects, the training signal S[k] may be designed to simplify the UE's estimation of the composite FDRSB component $S^*[-k]$ $C_{FDRSB.post.eq}[k]$ from the observed equalized signal $Y_{out}[k]$.

Figure 5A:
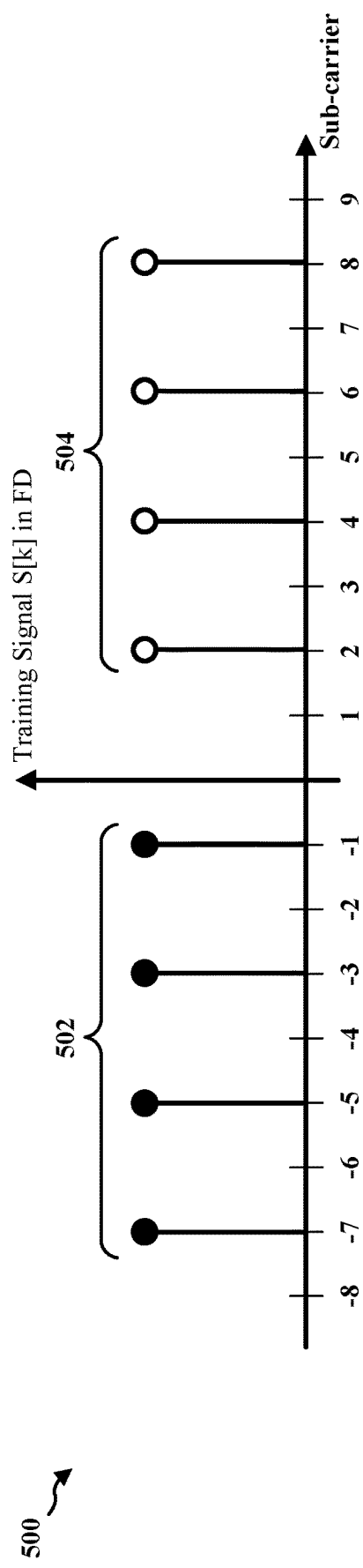
FIG. 5A is an example of training signal for estimating the composite FDRSB.

FIG. 5A is an example of training signal 500 for estimating the composite FDRSB. The training signal 500 may include a first set of tones 502 and a second set of tones 504. A tone may refer to a single subcarrier in frequency. The index of the sub-carriers may be assigned with reference of the center frequency of the bandwidth of the training signal S[k] including the plurality of sub-carriers. That is, the first set of tones 502 may be associated with a first set of sub-carriers with negative index numbers, and the second set of tones 504 may be associated with a second set of sub-carriers with positive index numbers.

FIG. 5A illustrates an example of a training signal 500 (e.g., S from FIG. 4) that includes the first set of tones 502 that are associated with the first set of sub-carriers with odd index numbers for the sub-carrier frequencies associated with negative index numbers, and the second set of tones 504 that are associated with the second set of sub-carriers with even index numbers for the sub-carrier frequencies associated with the positive index number. Therefore, the mirror sub-carriers (e.g., the positive numbered subcarrier that mirrors the negative numbered subcarrier such as 1 and −1) of the sub-carriers carrying the first set of tones 502 and the second set of tones 504 may be vacant sub-carriers. Here, the mirror sub-carrier may refer to mirroring (of symmetrical) sub-carriers with reference to the center frequency, and the vacant sub-carriers may refer to sub-carriers that do not carry a tone. For example, the mirror sub-carrier for a positive sub-carrier index is the corresponding negative sub-carrier index, e.g., −1 and 1 are mirror sub-carriers and 2− and 2 are mirror sub-carriers. Also, the negative index numbers may represent the sub-carrier frequencies that are below the center frequency of the plurality of sub-carriers, and the positive index numbers may represent the sub-carrier frequencies that are above the center frequency of the plurality of sub-carriers.

The example of the training signal 500 illustrated in FIG. 5A provides that the first set of tones 502 are associated with the first set of sub-carriers with odd index numbers for the sub-carrier frequencies associated with negative index numbers and the second set of tones 504 are associated with the second set of sub-carriers with even index numbers for the sub-carrier frequencies associated with the positive index number, but the current disclosure is not limited thereto. For example, the first set of tones may be associated with the first set of sub-carriers with odd index numbers for the sub-carrier frequencies associated with positive index numbers and the second set of tones may be associated with the second set of sub-carriers with even index numbers for the sub-carrier frequencies associated with the negative index number.

Figure 5B:
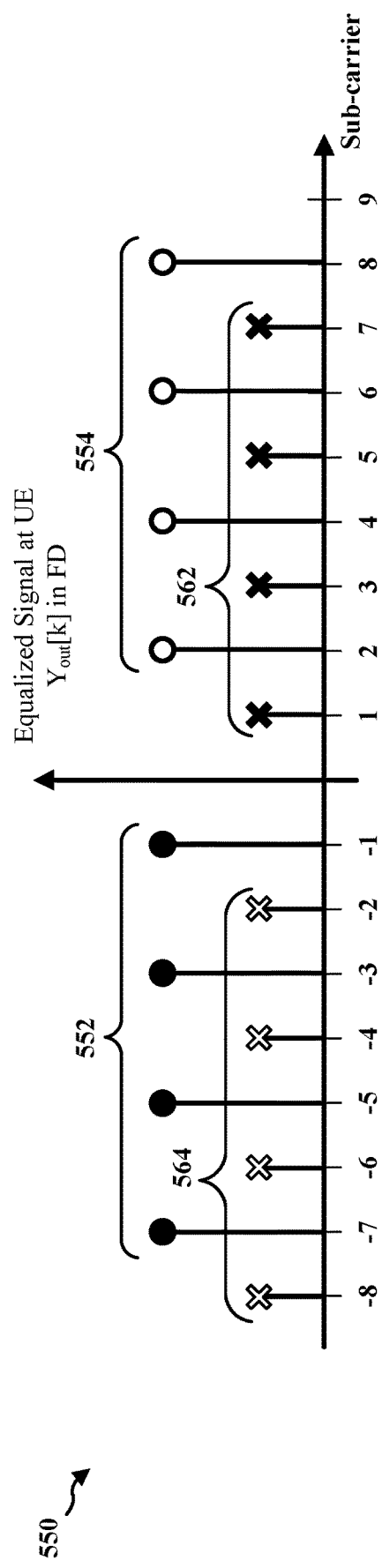
FIG. 5B is an example of equalized signal of the training signal measured at the UE.

FIG. 5B is an example of equalized signal 550 of the training signal 500 measured at the UE. The equalized signal 550 of the training signal 500 measured at the UE may be represented as $Y_{out}[k]=S[k]+S^*[-k]\cdot C_{FDRSB.post.eq}[k]$.

In one aspect, the equalized signal 550 of the training signal may include the first set of tones 552 and the second set of tones 554, which respectively correspond with the first set of tones 502 and the second set of tones 504 of the training signal 500. That is, the first set of tones 552 and the second set of tones 554 may correspond with S[k] of the equalized signal 550 represented as $Y_{out}[k]=S[k]+S^*[-k]\cdot C_{FDRSB.post.eq}[k]$.

In another aspect, the equalized signal 550 of the training signal further includes a third set of tones 562 and a fourth set of tones 564. The third set of tones 562 may represent the FDRSB impairment components caused by the first set of tones 552, which are associated with the mirroring (or symmetrical) sub-carriers with reference to the center frequency of the plurality of the sub-carriers. Also, the fourth set of tones 564 may represent the FDRSB impairment components caused by the second set of tones 554, which are associated with the mirroring (or symmetrical) sub-carriers with reference to the center frequency of the plurality of the sub-carriers.

For example, the first set of tones 552 are associated with the first set of sub-carriers corresponding to the negative odd index numbers and the second set of tones 554 that are associated with the second set of sub-carriers corresponding with the positive even index numbers and the mirroring (of symmetrical) sub-carriers with reference to the center frequency may be vacant sub-carriers, and the third set of tones 562 and the fourth set of tones 564 may be measured in the vacant sub-carriers. That is, the FDRSB impairment components, which are reflected on the mirror sub-carriers may leak into a vacant tone, and the estimation of $C_{FDRSB.post.eq}[k]$ may be less complex. That is, the third set of tones 562 and the fourth set of tones 564 may correspond with $S^*[-k]\cdot C_{FDRSB.post.eq}[k]$ of the equalized signal 550 represented as $Y_{out}[k]=S[k]+S^*[-k]\cdot C_{FDRSB.post.eq}[k]$, and the composite FDRSB filter may be estimated by measuring the response over the mirror tones including the third set of tones and the fourth set of tones 564.

Once the UE 450 has estimated the frequency response of the composite FDRSB components, the UE 450 may transmit a feedback 440 associated with the composite FDRSB. In one example, the UE 450 may calculate, or identify, a correction filter to address the composite FDRSB and may indicate the determined correction filter to the network. For example, the feedback 440 may include the composite FDRSB components (e.g., $S^*[-k]\cdot C_{FDRSB.post.eq}[k]$ or $C_{FDRSB.post.eq}[k]$) In other examples, the UE may provide measurement information to the network, and the network node may determine a correction filter based on the measurements from the UE. In some examples, the feedback 440 may include a measurement of the equalized signal 550 represented as $Y_{out}[k]=S[k]+S^*[-k]\cdot C_{FDRSB.post.eq}[k]$ [k]. In some aspects, the UE may send a final correction filter to the network node based on the measurements, e.g., $C_{FDRSB.correction}[k]=-C_{FDRSB.post.eq}[k]$. In some aspects, the UE may send the measurements themselves, e.g., $Y_{out}[k]=S[k]+S^*[-k]\cdot C_{FDRSB.\ post.eq}[k]$.

Figure 6:
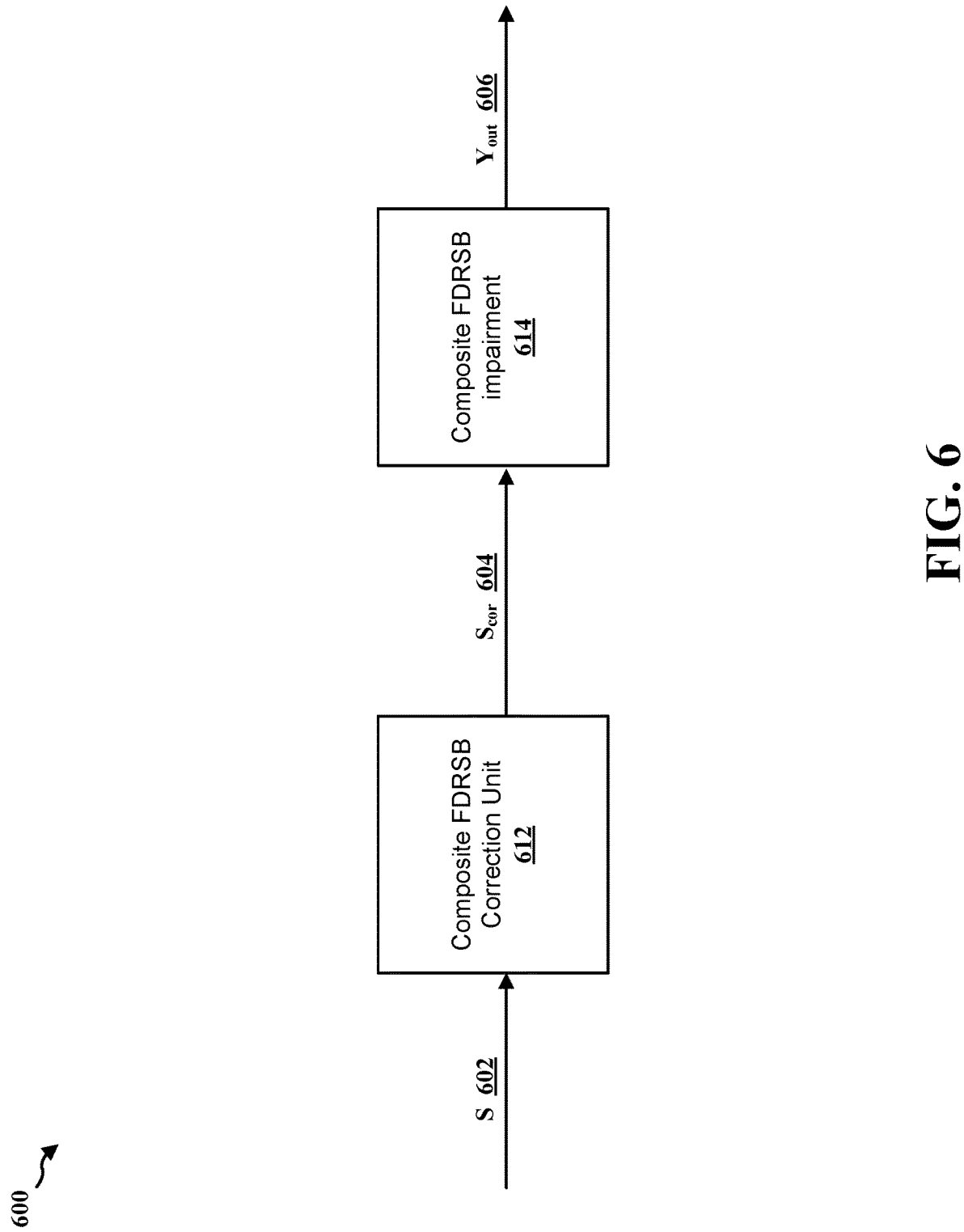
FIG. 6 illustrates a block diagram of composite FDRSB correction.

FIG. 6 illustrates a block diagram 600 of composite FDRSB correction. The block diagram 600 may include a composite FDRSB correction unit 612 in the network node, followed with the total equivalent composite FDRSB impairment 614. A signal S 602 to be transmitted to a UE may be input to the composite FDRSB correction unit 612, and the composite FDRSB correction unit 612 may be configured to output a corrected signal $S_{cor}[k]$ 604 as represented as $S_{cor}[k]=S[k]+S^*[-k]\cdot C_{FDRSB.correction}[k]$.

The corrected signal $S_{cor}[k]$ 604 may be transmitted through the multiple IQ modulators (e.g., the plurality of IQ modulations including the first IQ modulator 420 and the $N^{th}$ IQ modulator 428 of FIG. 4), the multiple antenna panels (e.g., the plurality of antenna panels including the first antenna panel 430 and the $N^{th}$ antenna panel 438 of FIG. 4), and the main channels. The UE may receive the corrected signal $S_{cor}[k]$ 604 transmitted through the multiple IQ modulators, the multiple antenna panels, and the main channels, and obtain the equalized signal $Y_{out}[k]$ 606 represented as $Y_{out}[k]=S_{cor}[k]+S_{cor}^*[-k]\cdot C_{FDRSB.post.eq}[k]$.

Accordingly, the equalized signal $Y_{out}[k]$ 606 measured at the UE may be calculated as:

$$Y_{out}[k]=S_{cor}[k]+S_{cor}^*[-k]\cdot C_{FDRSB.post.eq}[k]$$

$$=(S[k]+S^*[-k]\cdot C_{FDRSB.correction}[k])$$

$$+(S^*[-k]+S[k]\cdot C_{FDRSB.correction}[-k])$$

$$\cdot C_{FDRSB.post.eq}[k]$$

$$=S[k](1+C_{FDRSB.correction}^*[-k]C_{FDRSB.post.eq}[k])$$

$$+S^*[-k](C_{FDRSB.correction}[k]+C_{FDRSB.post.eq}[k]).$$

Therefore, to cancel the FDRSB impairment components, the correction filter may be configured to be $C_{FDRSB.correction}[k]=-C_{FDRSB.post.eq}[k]$. That is, based on the $C_{FDRSB.post.eq}[k]$ estimated from transmitting a training signal S[k] (e.g., FIGS. 4, 5A, and 5B), the network node may configure the composite FDRSB correction unit 612 so that the $C_{FDRSB.correction}[k]=-C_{FDRSB.post.eq}[k]$ to cancel out the FDRSB impairment components.

Accordingly, by applying the composite FDRSB correction unit 612 so that the $C_{FDRSB.correction}[k]=-C_{FDRSB.post.eq}[k]$ to cancel out the FDRSB impairment components, the equalized signal $Y_{out}[k]$ may be $Y_{out}[k]=S[k](1-C_{FDRSB.post.eq}^*[-k]C_{FDRSB.post.eq}[k])$. Here, the residual gain of $1-(C_{FDRSB.post.eq}[k])^2$ may be negligible, and it may also be captured and cancelled by the equalizer.

Figure 7:
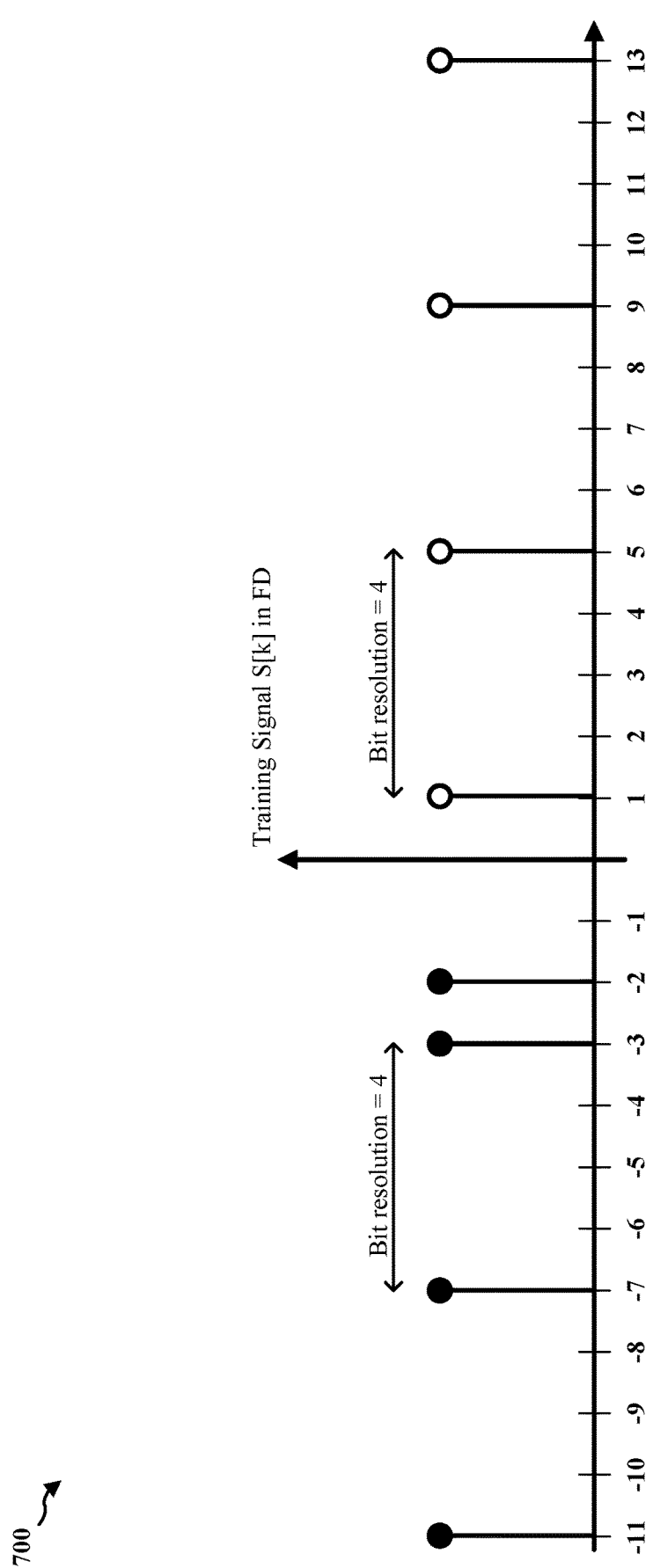
FIG. 7 is an example of training signal for estimating the composite FDRSB.

FIG. 7 is an example of training signal S[k] 700 for estimating the composite FDRSB. The training signal S[k] may be configured to have various shapes as long as each sub-carrier carrying a tone has a vacant mirror sub-carrier with respect to the center frequency. That is, the training signal S[k] may include at least one tone transmitted on a first subset of sub-carriers of the plurality of sub-carriers, and the first subset of sub-carriers may be mirroring or symmetric to a second subset of sub-carriers with respect to the center frequency of the plurality of sub-carriers, the second subset of sub-carriers being vacant sub-carriers that may be free of the tone of the training signal S[k]. In some aspects, the second subset of sub-carriers may be the mirror sub-carriers of the first subset of sub-carriers.

The example of training signal S[k] 700 illustrates that the training signal S[k] has a bit resolution of four (4), which means that the tone of the training signal S[k] is provided every four (4) sub-carriers. The sub-carriers having the tone of the training signal S[k] are configured so that the mirror sub-carrier with respect to the center frequency is a vacant sub-carrier. The example of training signal S[k] 700 shows that only a part of the sub-carriers allowed to carry the tones of the training signal S[k]. Because a reduced number of the sub-carriers are configured to carry the tones of the training signal S [k], the Tx signal power of the training signal S [k] may be divided over a smaller number of tones and the training signal S[k] may have a better SNR per signal tone. Accordingly, the estimation accuracy of FDRSB impairment component may be improved. Also, the FDRSB change over frequency is relatively slow, and the training signal for the FDRSB estimation may be configured with a less densely populated signal tones.

The configuration of the training signal S[k] may be flexible to account for various possible metrics of optimization while the basic criterion of each sub-carrier carrying the tone of the training signal S[k] may be configured to have a vacant mirror sub-carrier.

Figure 8:
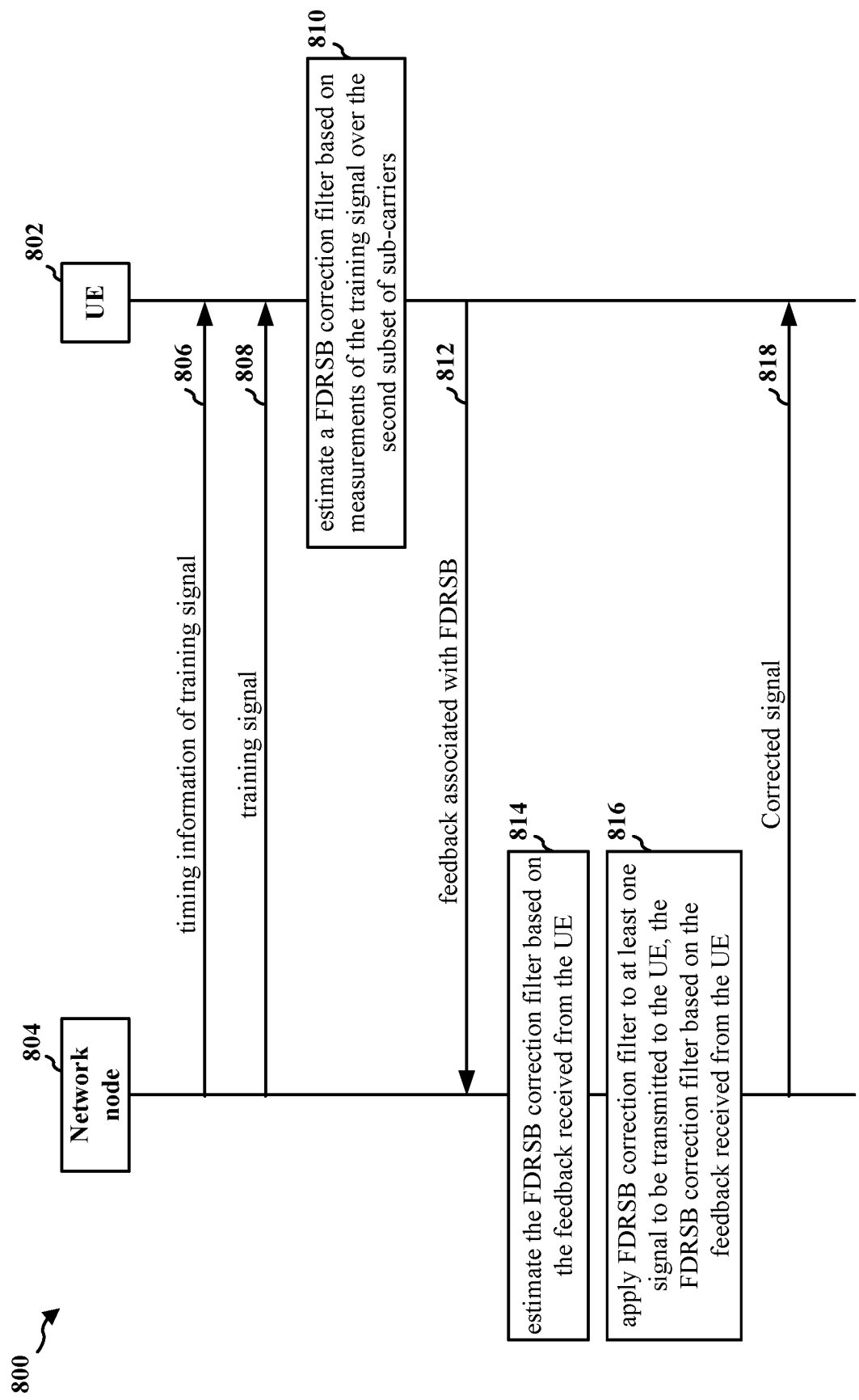
FIG. 8 is a call-flow diagram of a method of wireless communication.

FIG. 8 is a call-flow diagram 800 of a method of wireless communication. The call-flow diagram 800 may include a UE 802 and a network node 804. The network node 804 may be a base station 102 or a component of a base station, for example. The network node 804 may transmit a training signal for the UE 802 on a plurality of sub-carriers, the training signal being transmitted via multiple IQ modulators and multiple RF antenna panels and receive a feedback associated with an FDRSB based on the training signal. The network node 804 may apply an FDRSB correction filter to at least one signal to be transmitted to the UE 802, and the FDRSB correction filter may be based on the feedback received from the UE 802. The training signal may include at least one tone transmitted on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal.

At 806, the network node 804 may transmit timing information indicating when the training signal is transmitted for the UE 802. The UE 802 may receive timing information indicating when the training signal is received from the network node 804. The training signal may be transmitted and received with the timing indicated by the timing information. Here, the timing information may include an indication of a slot number or at least one symbol number at which the training signal is transmitted to the UE 802, and the indication may be transmitted at least once in response to a precoder update. The UE 802 may estimate the FDRSB correction filter based on the slot at which the training symbol(s) may be transmitted and feedback or transmit the calculated or estimated FDRSB correction filter to the network node 804 in response to the training symbol(s).

At 808, the network node 804 may transmit a training signal for a UE 802 on a plurality of sub-carriers, the training signal transmitted via multiple IQ modulators and multiple RF antenna panels. The UE 802 may receive a training signal from a network node 804 on a plurality of sub-carriers from multiple IQ modulators and multiple RF antenna panels.

In one aspect, the at least one tone of the training signal may be transmitted on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal.

In one example, the first subset of subcarriers may include even numbered sub-carriers on a first side of the center frequency of the plurality of sub-carriers and odd numbered sub-carriers on a second side of the center frequency of the plurality of sub-carriers. In another aspect, the training signal may be transmitted with a timing indicated by the timing information transmitted at 806.

In some aspects, the network node 804 may transmit the training signal to the UE 802 over the link configured on the network node 804 Tx side of multiple antennas panels (e.g., multiple RF panels/RRH units) which may generate beamforming using coefficients $P_{ij}$. The multiple antenna panels may be fed with multiple IQ modulators, and each of the multiple IQ modulators may be impaired with different FDRSBs.

The training signal may be applied to the multiple IQ modulators, and the IQ modulated training signal may be represented as: $Z_i[k]=S[k]+F_i[k] \cdot S^*[-k]$, where $S[k]$ may refer to the training signal in the FD domain and the $F_i[k]$ may refer to the FDRSB impairment component of the modulator.

The UE 802 may receive the $Z_i[k]$ after passing the beam-former and the channel, and the signal received on the UE 802 side may be represented as $Y[k]=\Sigma_i Z_i[k]\Sigma_j P_{ij}[k]H_{ij}[k]=\Sigma_i Z_i[k]G_i[k]$. Here, the $G_i[k]=\Sigma_j P_{ij}[k]H_{ij}[k]$ may represent the beam-former and the channel. Accordingly, the received signal may be further represented as:

$$Y_{out}[k]=\Sigma_i(S[k]+F_i[k] \cdot S^*[-k])G_i[k]=S[k]\Sigma_i G_i[k]+S^*[-k]\Sigma_i G_i[k]F_i[k].$$

Here, $\Sigma_i G_i[k]$ may represent the main channel which may be referred to as a $C_{main}[k]$, and $\Sigma_i G_i[k]F_i[k]$ may represent the FDRSB channel which may be referred to as a $C_{FDRSB}[k]$.

The UE 802 may equalize the received signal to cancel the main channel $C_{main}[k]$, and an equalized signal $Y_{out}[k]$ at the UE 802 that may be represented as:

$$Y_{out}[k]C_{main}^{-1}[k] \cdot Y[k]=S[k]+S^*[-k] \cdot C_{FDRSB}[k] \cdot C_{main}[k]$$

Here, $S^*[-k] \cdot C_{FDRSB}[k] C_{main}^{-1}[k]$ may represent the composite FDRSB component observed at the UE 802, and the $C_{FDRSB}[k]C_{main}^{-1}[k]$ may be referred to as $C_{FDRSB,post.eq}[k]$. Accordingly, the equalized signal $Y_{out}[k]$ at the UE 802 may be represented as:

$$Y_{out}[k]=S[k]+S^*[-k] \cdot C_{FDRSB,post.eq}[k]$$

In some aspects, the training signal S[k] may be designed for the UE 802 to easily estimate the composite FDRSB component $S^*[-k] \cdot C_{FDRSB,post.eq}[k]$ from the observed equalized signal $Y_{out}[k]$.

At 810, the UE 802 may estimate an FDRSB correction filter based on measurements of the training signal over the second subset of sub-carriers. To cancel the FDRSB impairment components, the correction filter may be configured to be $C_{FDRSB,correction}[k]=-C_{FDRSB,post.eq}[k]$. That is, based on the $C_{FDRSB,post.eq}[k]$ estimated from the training signal (e.g., FIGS. 4, 5A, and 5B), the network node 804 may configure the composite FDRSB correction unit (e.g., the composite FDRSB correction unit 612) so that the $C_{FDRSB,correction}[k]=C_{FDRSB,post.eq}[k]$ to cancel out the composite FDRSB impairment components.

At 812, the UE 802 may transmit a feedback associated with an FDRSB based on the training signal to the network node 804. The network node 804 may receive a feedback associated with an FDRSB based on the training signal. In one example, the feedback may include measurements of the training signal over the second subset of sub-carriers. In another example, the feedback received from the UE 802 may include an estimation of the FDRSB correction filter measured over the second subset of sub-carriers. The FDRSB correction filter may be estimated at 810.

At 814, the network node 804 may estimate the FDRSB correction filter based on the feedback received from the UE 802. To cancel the FDRSB impairment components, the correction filter may be configured to be $C_{FDRSB.correction}[k]=-C_{FDRSB.post.eq}[k]$. That is, based on the $C_{FDRSB.post.eq}[k]$ estimated from the training signal (e.g., FIGS. 4, 5A, and 5B), the network node 804 may configure the composite FDRSB correction unit (e.g., the composite FDRSB correction unit 612) so that the $C_{FDRSB.correction}[k]=-C_{FDRSB.post.eq}[k]$ to cancel out the composite FDRSB impairment components.

At 816, the network node 804 may apply an FDRSB correction filter to at least one signal to be transmitted to the UE 802, the FDRSB correction filter based on the feedback received from the UE 802. Here, the $C_{FDRSB.correction}[k]=-C_{FDRSB.post.eq}[k]$ to cancel tout the composite FDRSB impairment components.

At 818, the network node 804 may transmit the at least one signal to the UE 802 via the multiple IQ modulators. The FDRSB correction filter may be applied to the at least one signal before the multiple IQ modulators.

Figure 9:
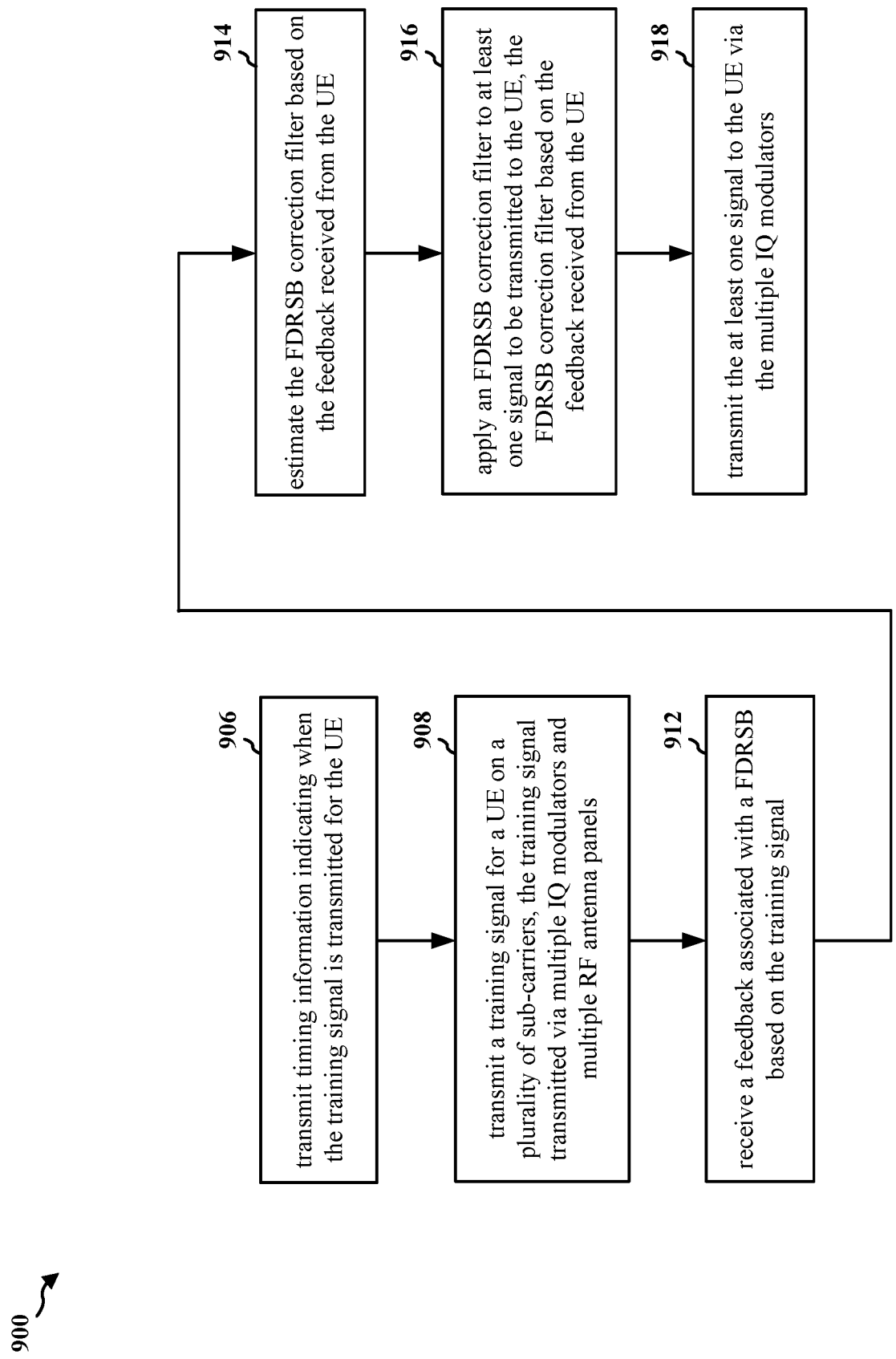
FIG. 9 is a flowchart of a method of wireless communication.

FIG. 9 is a flowchart 900 of a method of wireless communication. The method may be performed by a network node (e.g., the base station 102; the network node 410/804; the network entity 1402/1560). The network node may transmit a training signal for a UE on a plurality of sub-carriers, the training signal being transmitted via multiple IQ modulators and multiple RF antenna panels and receive a feedback associated with an FDRSB based on the training signal. The network node may apply an FDRSB correction filter to at least one signal to be transmitted to the UE, and the FDRSB correction filter may be based on the feedback received from the UE. The training signal may include at least one tone transmitted on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal.

At 906, the network node may transmit timing information indicating when the training signal is transmitted for the UE. The training signal may be transmitted and received with the timing indicated by the timing information. Here, the timing information may include an indication of a slot number or at least one symbol number at which the training signal is transmitted to the UE, and the indication may be transmitted at least once in response to a precoder update. The UE may estimate the FDRSB correction filter based on the slot at which the training symbol(s) may be transmitted and feedback or transmit the calculated or estimated FDRSB correction filter to the network node in response to the training symbol(s). For example, at 806, the network node 804 may transmit timing information indicating when the training signal is transmitted for the UE 802. Furthermore, 906 may be performed by an FDRSB estimation component 198.

At 908, the network node may transmit a training signal for the UE on a plurality of sub-carriers, the training signal transmitted via multiple IQ modulators and multiple RF antenna panels. For example, at 808, the network node 804 may transmit a training signal for a UE 802 on a plurality of sub-carriers, the training signal transmitted via multiple IQ modulators and multiple RF antenna panels. Furthermore, 908 may be performed by the FDRSB estimation component 198.

In one aspect, the at least one tone of the training signal may be transmitted on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal.

In one example, the first subset of subcarriers may include even numbered sub-carriers on a first side of the center frequency of the plurality of sub-carriers and odd numbered sub-carriers on a second side of the center frequency of the plurality of sub-carriers. In another aspect, the training signal may be transmitted with a timing indicated by the timing information transmitted at 906.

In some aspects, the network node may transmit the training signal to the UE over the link configured on the network node Tx side of multiple antennas panels (e.g., multiple RF panels/RRH units) which may generate beamforming using coefficients $P_{ij}$. The multiple antenna panels may be fed with multiple IQ modulators, and each of the multiple IQ modulators may be impaired with different FDRSBs.

The training signal may be applied to the multiple IQ modulators, and the IQ modulated training signal may be represented as: $Z_i[k]=S[k]+F_i[k] \cdot S^*[-k]$, where $S[k]$ may refer to the training signal in the FD domain and the $F_i[k]$ may refer to the FDRSB impairment component of the modulator.

The UE may receive the $Z_i[k]$ after passing the beamformer and the channel, and the signal received on the UE side may be represented as $Y[k]=\Sigma_i Z_i[k]\Sigma_j P_{ij}[k]H_{ij}[k]=\Sigma_i Z_i[k]G_i[k]$. Here, the $G_i[k]=\Sigma_j P_{ij}[k]H_{ij}[k]$ may represent the beam-former and the channel. Accordingly, the received signal may be further represented as:

$$Y_{out}[k]=\Sigma_i(S[k]+F_i[k] \cdot S^*[-k])G_i[k]=S[k]\Sigma_i G_i[k]+S^*[-k]\Sigma_i G_i[k]F_i[k].$$

Here, $\Sigma_i G_i[k]$ may represent the main channel which may be referred to as a $C_{main}[k]$, and $\Sigma_i G_i[k]F_i[k]$ may represent the FDRSB channel which may be referred to as a $C_{FDRSB}[k]$.

The UE may equalize the received signal to cancel the main channel $C_{main}[k]$, and an equalized signal $Y_{out}[k]$ at the UE that may be represented as:

$$Y_{out}[k]=C_{main}^{-1}[k] \cdot Y[k]=S[k]+S^*[-k] \cdot C_{FDRSB}[k]C_{main}^{-1}[k]$$

Here, $S^*[-k] \cdot C_{FDRSB}[k]C_{main}^{-1}[k]$ may represent the composite FDRSB component observed at the UE, and the $C_{FDRSB}[k]C_{main}^{-1}[k]$ may be referred to as $C_{FDRSB.post.eq}[k]$. Accordingly, the equalized signal $Y_{out}[k]$ at the UE may be represented as:

$$Y_{out}[k]=S[k]+S^*[-k] \cdot C_{FDRSB.post.eq}[k]$$

In some aspects, the training signal $S[k]$ may be designed for the UE to easily estimate the composite FDRSB component $S^*[-k] C_{FDRSB.post.eq}[k]$ from the observed equalized signal $Y_{out}[k]$.

At 912, the network node may receive a feedback associated with an FDRSB based on the training signal. In one example, the feedback may include measurements of the training signal over the second subset of sub-carriers. In another example, the feedback received from the UE may include an estimation of the FDRSB correction filter measured over the second subset of sub-carriers. The FDRSB correction filter may be estimated at 910. For example, at 812, the network node 804 may receive a feedback associated with an FDRSB based on the training signal. Furthermore, 912 may be performed by the FDRSB estimation component 198.

At 914, the network node may estimate the FDRSB correction filter based on the feedback received from the UE. To cancel the FDRSB impairment components, the correction filter may be configured to be $C_{FDRSB.correction}[k]=-C_{FDRSB.post.eq}[k]$. That is, based on the $C_{FDRSB.post.eq}[k]$ estimated from the training signal (e.g., FIGS. 4, 5A, and 5B), the network node may configure the composite FDRSB correction unit (e.g., the composite FDRSB correction unit 612) so that the $C_{FDRSB.correction}[k]=-C_{FDRSB.post.eq}[k]$ to cancel out the composite FDRSB impairment components. For example, at 814, the network node 804 may estimate the FDRSB correction filter based on the feedback received from the UE 802. Furthermore, 914 may be performed by the FDRSB estimation component 198.

At 916, the network node may apply an FDRSB correction filter to at least one signal to be transmitted to the UE, the FDRSB correction filter based on the feedback received from the UE. Here, the $C_{FDRSB.correction}[k]=-C_{FDRSB.post.eq}[k]$ to cancel tout the composite FDRSB impairment components. For example, at 816, the network node 804 may apply an FDRSB correction filter to at least one signal to be transmitted to the UE 802, the FDRSB correction filter based on the feedback received from the UE 802. Furthermore, 916 may be performed by an FDRSB estimation component 198.

At 918, the network node may transmit the at least one signal to the UE 802 via the multiple IQ modulators. The FDRSB correction filter may be applied to the at least one signal before the multiple IQ modulators. For example, at 818, the network node 804 may transmit the at least one signal to the UE 802 via the multiple IQ modulators. Furthermore, 918 may be performed by the FDRSB estimation component 198.

Figure 10:
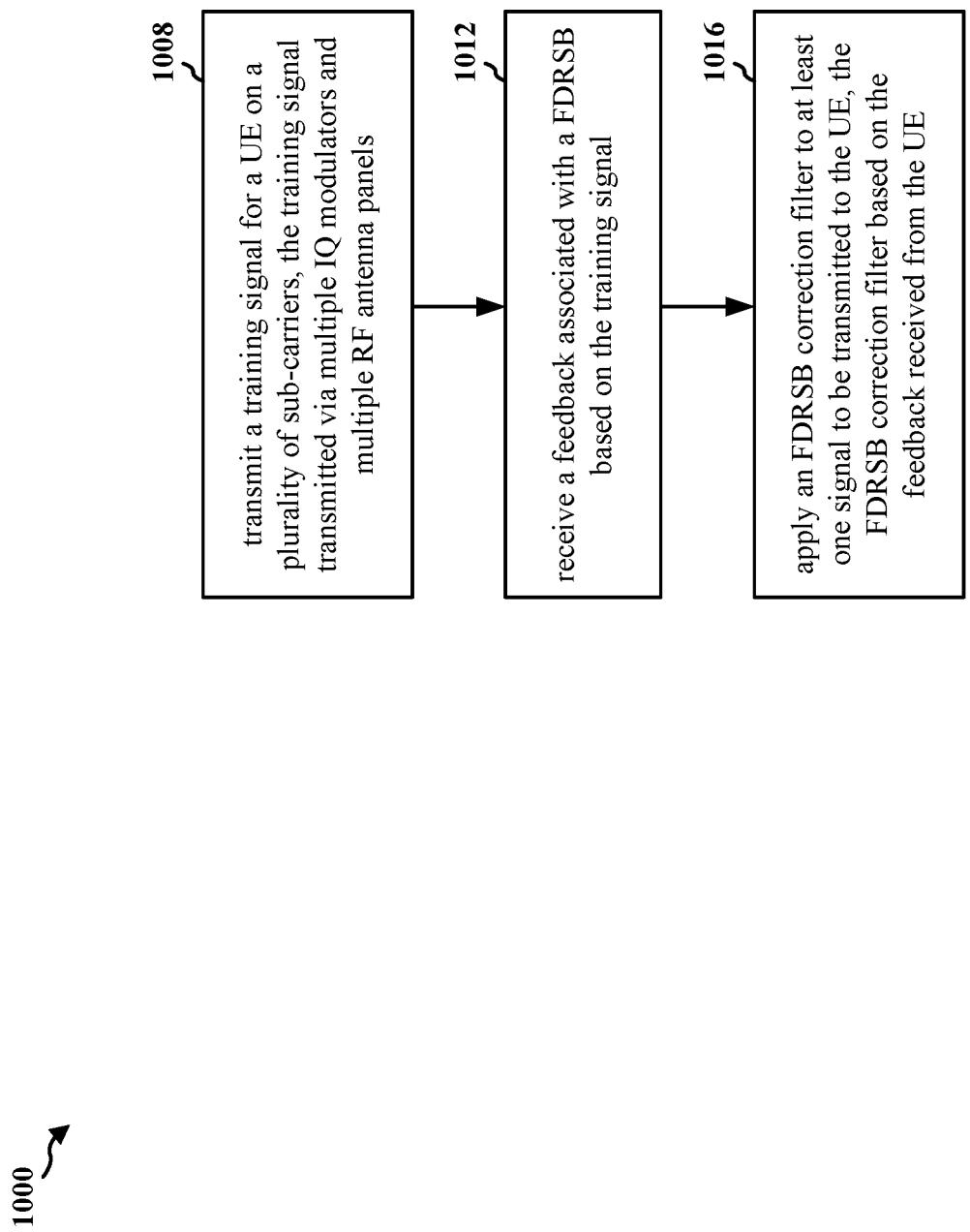
FIG. 10 is a flowchart of a method of wireless communication.

FIG. 10 is a flowchart 1000 of a method of wireless communication. The method may be performed by a network node (e.g., the base station 102; the network node 410/804; the network entity 1402/1560). The network node may transmit a training signal for a UE on a plurality of sub-carriers, the training signal being transmitted via multiple IQ modulators and multiple RF antenna panels and receive a feedback associated with an FDRSB based on the training signal. The network node may apply an FDRSB correction filter to at least one signal to be transmitted to the UE, and the FDRSB correction filter may be based on the feedback received from the UE. The training signal may include at least one tone transmitted on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal.

At 1008, the network node may transmit a training signal for the UE on a plurality of sub-carriers, the training signal transmitted via multiple IQ modulators and multiple RF antenna panels. For example, at 808, the network node 804 may transmit a training signal for a UE 802 on a plurality of sub-carriers, the training signal transmitted via multiple IQ modulators and multiple RF antenna panels. Furthermore, 1008 may be performed by the FDRSB estimation component 198.

In one aspect, the at least one tone of the training signal may be transmitted on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal.

In one example, the first subset of subcarriers may include even numbered sub-carriers on a first side of the center frequency of the plurality of sub-carriers and odd numbered sub-carriers on a second side of the center frequency of the plurality of sub-carriers. In another aspect, the training signal may be transmitted with a timing indicated by the timing information transmitted.

In some aspects, the network node may transmit the training signal to the UE over the link configured on the network node Tx side of multiple antennas panels (e.g., multiple RF panels/RRH units) which may generate beam-forming using coefficients $P_{ij}$. The multiple antenna panels may be fed with multiple IQ modulators, and each of the multiple IQ modulators may be impaired with different FDRSB s.

The training signal may be applied to the multiple IQ modulators, and the IQ modulated training signal may be represented as: $Z_i[k]=S[k]+F_i[k]\cdot S^*[-k]$, where $S[k]$ may refer to the training signal in the FD domain and the $F_i[k]$ may refer to the FDRSB impairment component of the $i^{th}$ modulator.

The UE may receive the $Z_i[k]$ after passing the beam-former and the channel, and the signal received on the UE side may be represented as $Y[k]=\Sigma_i Z_i[k]\Sigma_j P_{ij}[k]H_{ij}[k]=\Sigma_i Z_i[k]G_i[k]$. Here, the $G_i[k]=\Sigma_j P_{ij}[k]H_{ij}[k]$ may represent the beam-former and the channel. Accordingly, the received signal may be further represented as:

$$Y[k]=\Sigma_i(S[k]+F_i[k]\cdot S^*[-k])G_i[k]=S[k]G_i[k]+S^*[-k]\Sigma_i G_i[k]F_i[k].$$

Here, $\Sigma_i G_i[k]$ may represent the main channel which may be referred to as a $C_{main}[k]$, and $\Sigma_i G_i[k]F_i[k]$ may represent the FDRSB channel which may be referred to as a $C_{FDRSB}[k]$.

The UE may equalize the received signal to cancel the main channel $C_{main}[k]$, and an equalized signal $Y_{out}[k]$ at the UE that may be represented as:

$$Y_{out}[k]=C_{main}^{-1}[k]\cdot Y[k]=S[k]+S^*[-k]\cdot C_{FDRSB}[k]C_{main}^{-1}[k]$$

Here, $S^*[-k]\cdot C_{FDRSB}[k]C_{main}^{-1}[k]$ may represent the composite FDRSB component observed at the UE, and the $C_{FDRSB}[k]C_{main}^{-1}[k]$ may be referred to as $C_{FDRSB.post.eq}[k]$. Accordingly, the equalized signal $Y_{out}[k]$ at the UE may be represented as:

$$Y_{out}[k]=S[k]+S^*[-k]\cdot C_{FDRSB.post.eq}[k]$$

In some aspects, the training signal S[k] may be designed for the UE to easily estimate the composite FDRSB component $S^*[-k]\cdot C_{FDRSB.post.eq}[k]$ from the observed equalized signal $Y_{out}[k]$.

At 1012, the network node may receive a feedback associated with an FDRSB based on the training signal. In one example, the feedback may include measurements of the training signal over the second subset of sub-carriers. In another example, the feedback received from the UE may include an estimation of the FDRSB correction filter measured over the second subset of sub-carriers. The FDRSB correction filter may be estimated. For example, at 812, the network node 804 may receive a feedback associated with an FDRSB based on the training signal. Furthermore, 1012 may be performed by the FDRSB estimation component 198.

At 1016, the network node may apply an FDRSB correction filter to at least one signal to be transmitted to the UE, the FDRSB correction filter based on the feedback received from the UE. Here, the $C_{FDRSB.correction}[k]=-C_{FDRSB.post.eq}[k]$ to cancel tout the composite FDRSB impairment components. For example, at 816, the network node 804 may apply an FDRSB correction filter to at least one signal to be transmitted to the UE 802, the FDRSB correction filter based on the feedback received from the UE 802. Furthermore, 1016 may be performed by an FDRSB estimation component 198.

Figure 11:
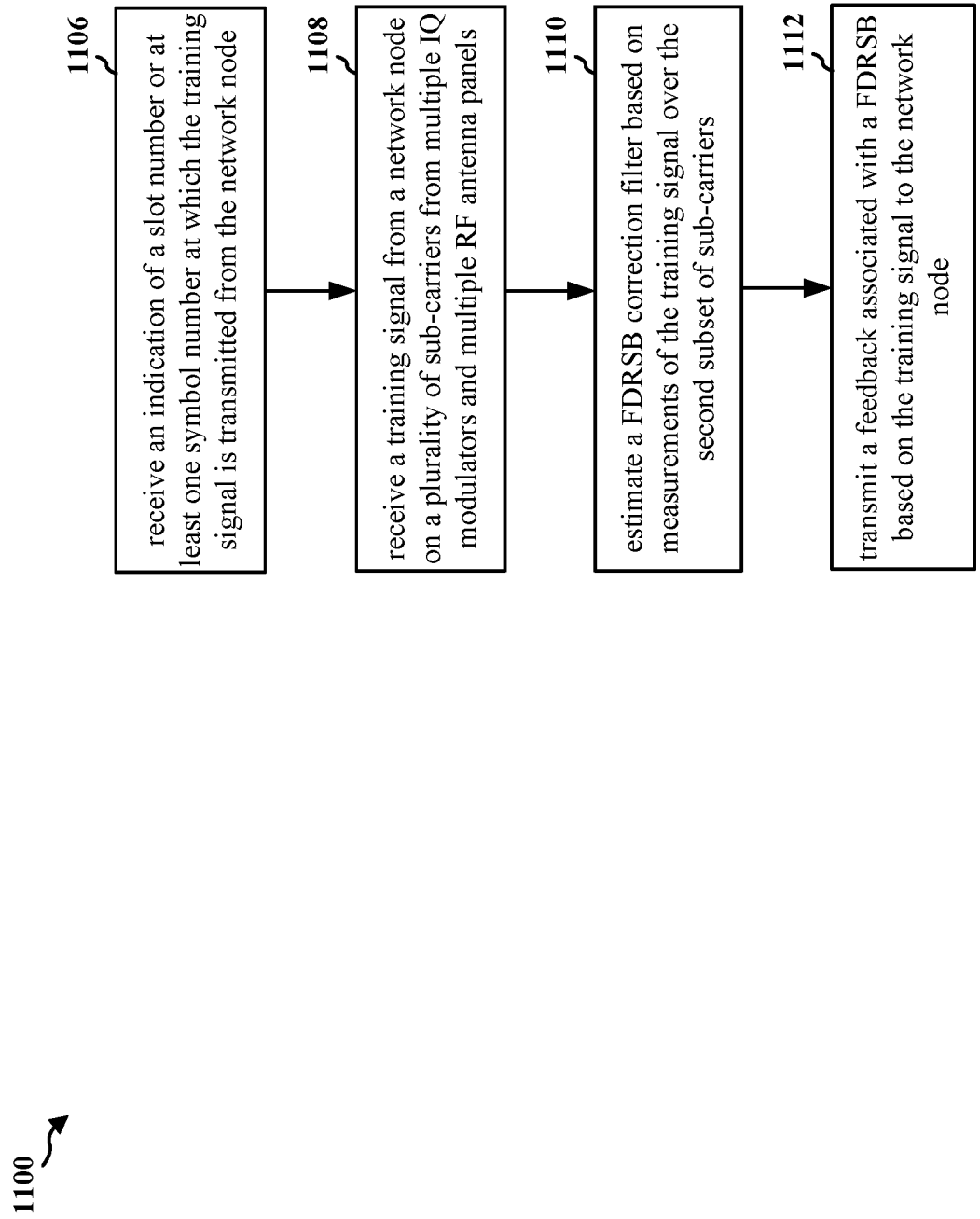
FIG. 11 is a flowchart of a method of wireless communication.

FIG. 11 is a flowchart 1100 of a method of wireless communication. The method may be performed by a UE (e.g., the UE 104/450/802; the apparatus 1304). The UE may receive a training signal from a network node on a plurality of sub-carriers, the training signal being received via multiple IQ modulators and multiple RF antenna panels and transmit a feedback associated with an FDRSB based on the training signal. The training signal may include at least one tone transmitted on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal.

At 1106, the UE may receive timing information indicating when the training signal is received from the network node. The training signal may be transmitted and received with the timing indicated by the timing information. Here, the timing information may include an indication of a slot number or at least one symbol number at which the training signal is transmitted to the UE, and the indication may be transmitted at least once in response to a precoder update. The UE may estimate the FDRSB correction filter based on the slot at which the training symbol(s) may be transmitted and feedback or transmit the calculated or estimated FDRSB correction filter to the network node in response to the training symbol(s). For example, at 806, the UE 802 may receive timing information indicating when the training signal is received from the network node 804. Furthermore, 1106 may be performed by an FDRSB correction component 199.

At 1108, the UE may receive a training signal from a network node on a plurality of sub-carriers from multiple IQ modulators and multiple RF antenna panels. For example, at 808, the UE 802 may receive a training signal from a network node 804 on a plurality of sub-carriers from multiple IQ modulators and multiple RF antenna panels. Furthermore, 1108 may be performed by the FDRSB correction component 199.

In one aspect, the at least one tone of the training signal may be transmitted on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal.

In one example, the first subset of subcarriers may include even numbered sub-carriers on a first side of the center frequency of the plurality of sub-carriers and odd numbered sub-carriers on a second side of the center frequency of the plurality of sub-carriers. In another aspect, the training signal may be transmitted with a timing indicated by the timing information transmitted at 1106.

In some aspects, the network node may transmit the training signal to the UE over the link configured on the network node Tx side of multiple antennas panels (e.g., multiple RF panels/RRH units) which may generate beamforming using coefficients $P_{ij}$. The multiple antenna panels may be fed with multiple IQ modulators, and each of the multiple IQ modulators may be impaired with different FDRSB s.

The training signal may be applied to the multiple IQ modulators, and the IQ modulated training signal may be represented as: $Z_i[k]=S[k]+F_i[k]\cdot S^*[-k]$, where S[k] may refer to the training signal in the FD domain and the $F_i[k]$ may refer to the FDRSB impairment component of the modulator.

The UE may receive the $Z_i[k]$ after passing the beam-former and the channel, and the signal received on the UE side may be represented as $Y[k]=\Sigma_i Z_i[k]\Sigma_j P_{ij}[k]H_{ij}[k]=\Sigma_i Z_i[k]G_i[k]$. Here, the $G_i[k]=\Sigma_j P_{ij}[k]H_{ij}[k]$ may represent the beam-former and the channel. Accordingly, the received signal may be further represented as:

$$Y[k]=\Sigma_i(S[k]+F_i[k]\cdot S^*[-k])G_i[k]=S[k]G_i[k]+S^*[-k]\Sigma_i G_i[k]F_i[k].$$

Here, $\Sigma_i G_i[k]$ may represent the main channel which may be referred to as a $C_{main}[k]$, and $\Sigma_i G_i[k] F_i[k]$ may represent the FDRSB channel which may be referred to as a $C_{FDRSB}[k]$ The UE may equalize the received signal to cancel the main channel $C_{main}[k]$, and an equalized signal $Y_{out}[k]$ at the UE that may be represented as:

$$Y_{out}[k]=C_{main}^{-1}[k]\cdot Y[k]=S[k]+S^*[-k]\cdot C_{FDRSB}[k]$$
$$C_{main}^{-1}[k]$$

Here, $S^*[-k] C_{FDRSB}[k]C_{main}^{-1}[k]$ may represent the composite FDRSB component observed at the UE, and the $C_{FDRSB}[k]C_{main}^{-1}[k]$ may be referred to as $C_{FDRSB.post.eq}[k]$. Accordingly, the equalized signal $Y_{out}[k]$ at the UE may be represented as:

$$Y_{out}[k]=S[k]+S^*[-k]\cdot C_{FDRSB.post.eq}[k]$$

In some aspects, the training signal S[k] may be designed for the UE to easily estimate the composite FDRSB component $S^*[-k] C_{FDRSB.post.eq}[k]$ from the observed equalized signal $Y_{out}[k]$.

At 1110, the UE may estimate an FDRSB correction filter based on measurements of the training signal over the second subset of sub-carriers. To cancel the FDRSB impairment components, the correction filter may be configured to be $C_{FDRSB.correction}[k]=-C_{FDRSB.post.eq}[k]$. That is, based on the $C_{FDRSB.post.eq}[k]$ estimated from the training signal (e.g., FIGS. 4, 5A, and 5B), the network node 804 may configure the composite FDRSB correction unit (e.g., the composite FDRSB correction unit 612) so that the $C_{FDRSB.correction}[k]=-C_{FDRSB.post.eq}[k]$ to cancel out the composite FDRSB impairment components. For example, at 810, the UE 802 may estimate an FDRSB correction filter based on measurements of the training signal over the second subset of sub-carriers. Furthermore, 1110 may be performed by the FDRSB correction component 199.

At 1112, the UE may transmit a feedback associated with an FDRSB based on the training signal to the network node. In one example, the feedback may include measurements of the training signal over the second subset of sub-carriers. In another example, the feedback received from the UE may include an estimation of the FDRSB correction filter measured over the second subset of sub-carriers. The FDRSB correction filter may be estimated at 1110. For example, at 812, the UE 802 may transmit a feedback associated with an FDRSB based on the training signal to the network node 804. Furthermore, 1112 may be performed by the FDRSB correction component 199.

Figure 12:
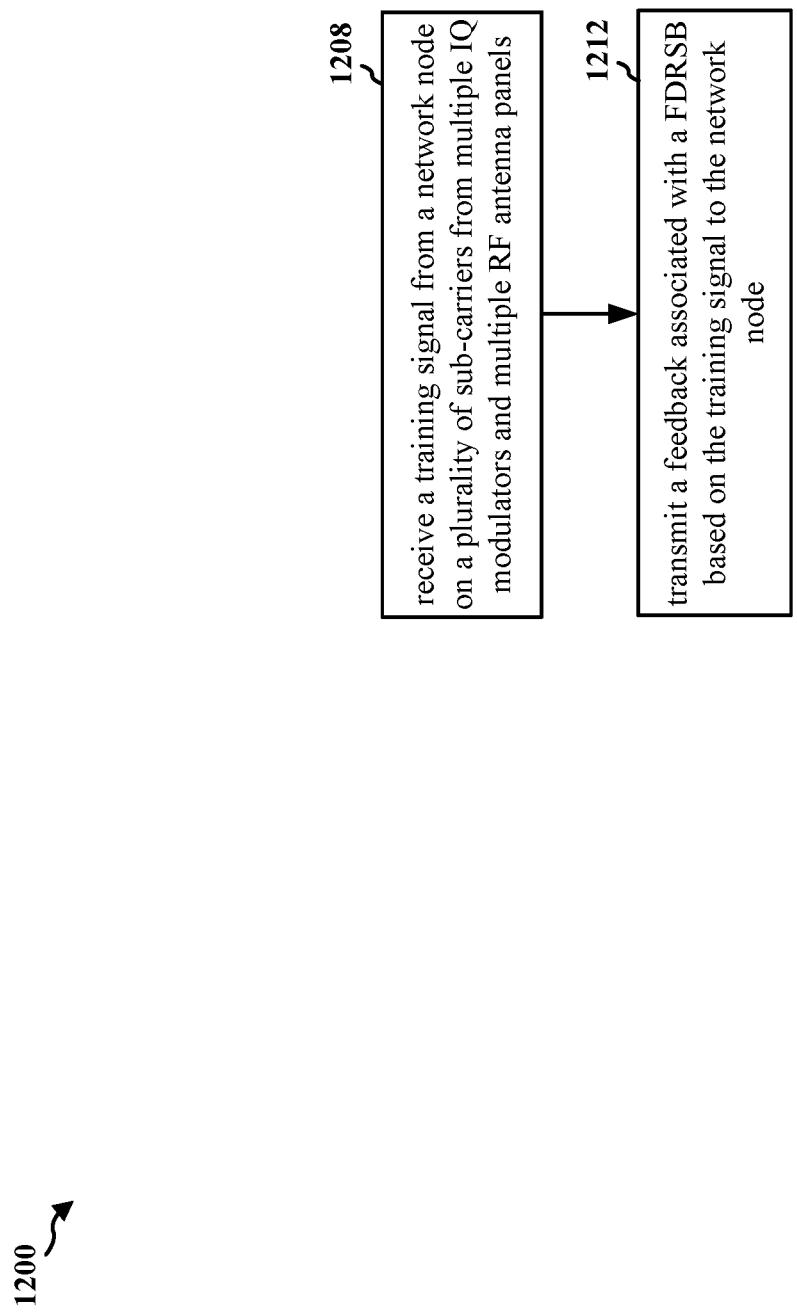
FIG. 12 is a flowchart of a method of wireless communication.

FIG. 12 is a flowchart 1200 of a method of wireless communication. The method may be performed by a UE (e.g., the UE 104/450/802; the apparatus 1304). The UE may receive a training signal from a network node on a plurality of sub-carriers, the training signal being received via multiple IQ modulators and multiple RF antenna panels and transmit a feedback associated with an FDRSB based on the training signal. The training signal may include at least one tone transmitted on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal.

At 1208, the UE may receive a training signal from a network node on a plurality of sub-carriers from multiple IQ modulators and multiple RF antenna panels. For example, at 808, the UE 802 may receive a training signal from a network node 804 on a plurality of sub-carriers from multiple IQ modulators and multiple RF antenna panels. Furthermore, 1208 may be performed by the FDRSB correction component 199.

In one aspect, the at least one tone of the training signal may be transmitted on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal.

In one example, the first subset of subcarriers may include even numbered sub-carriers on a first side of the center frequency of the plurality of sub-carriers and odd numbered sub-carriers on a second side of the center frequency of the plurality of sub-carriers. In another aspect, the training signal may be transmitted with a timing indicated by the timing information transmitted.

In some aspects, the network node may transmit the training signal to the UE over the link configured on the network node Tx side of multiple antennas panels (e.g., multiple RF panels/RRH units) which may generate beamforming using coefficients $P_{ij}$. The multiple antenna panels may be fed with multiple IQ modulators, and each of the multiple IQ modulators may be impaired with different FDRSB s.

The training signal may be applied to the multiple IQ modulators, and the IQ modulated training signal may be represented as: $Z_i[k]=S[k]+F_i[k] \cdot S^*[-k]$, where $S[k]$ may refer to the training signal in the FD domain and the $F_i[k]$ may refer to the FDRSB impairment component of the modulator.

The UE may receive the $Z_i[k]$ after passing the beam-former and the channel, and the signal received on the UE side may be represented as $Y[k]=\Sigma_i Z_i[k]\Sigma_j P_{ij}[k]H_{ij}[k]=\Sigma_i Z_i[k]G_i[k]$. Here, the $G_i[k]=\Sigma_j P_{ij}[k]H_{ij}[k]$ may represent the beam-former and the channel. Accordingly, the received signal may be further represented as:

$$Y[k]=\Sigma_i(S[k]+F_i[k] \cdot S^*[-k])G_i[k]=S[k]\Sigma_i G_i[k]+S^*[-k]\Sigma_i G_i[k]F_i[k].$$

Here, $\Sigma_i G_i[k]$ may represent the main channel which may be referred to as a $C_{main}[k]$, and $\Sigma_i G_i[k]F_i[k]$ may represent the FDRSB channel which may be referred to as a $C_{FDRSB}[k]$.

The UE may equalize the received signal to cancel the main channel $C_{main}[k]$, and an equalized signal $Y_{out}[k]$ at the UE that may be represented as:

$$Y_{out}[k]=C_{main}^{-1}[k] \cdot Y[k]=S[k]+S^*[-k] \cdot C_{FDRSB}[k] \cdot C_{main}^{-1}[k]$$

Here, $S^*[-k] \cdot C_{FDRSB}[k]C_{main}^{-1}[k]$ may represent the composite FDRSB component observed at the UE, and the $C_{FDRSB}[k]C_{main}^{-1}[k]$ may be referred to as $C_{FDRSB,post.eq}[k]$. Accordingly, the equalized signal $Y_{out}[k]$ at the UE may be represented as:

$$Y_{out}[k]=S[k]+S^*[-k] \cdot C_{FDRSB,post.eq}[k]$$

In some aspects, the training signal $S[k]$ may be designed for the UE to easily estimate the composite FDRSB component $S^*[-k] \cdot C_{FDRSB,post.eq}[k]$ from the observed equalized signal $Y_{out}[k]$.

At 1212, the UE may transmit a feedback associated with an FDRSB based on the training signal to the network node. In one example, the feedback may include measurements of the training signal over the second subset of sub-carriers. In another example, the feedback received from the UE may include an estimation of the FDRSB correction filter measured over the second subset of sub-carriers. The FDRSB correction filter may be estimated. For example, at 812, the UE 802 may transmit a feedback associated with an FDRSB based on the training signal to the network node 804. Furthermore, 1212 may be performed by the FDRSB correction component 199.

Figure 13:
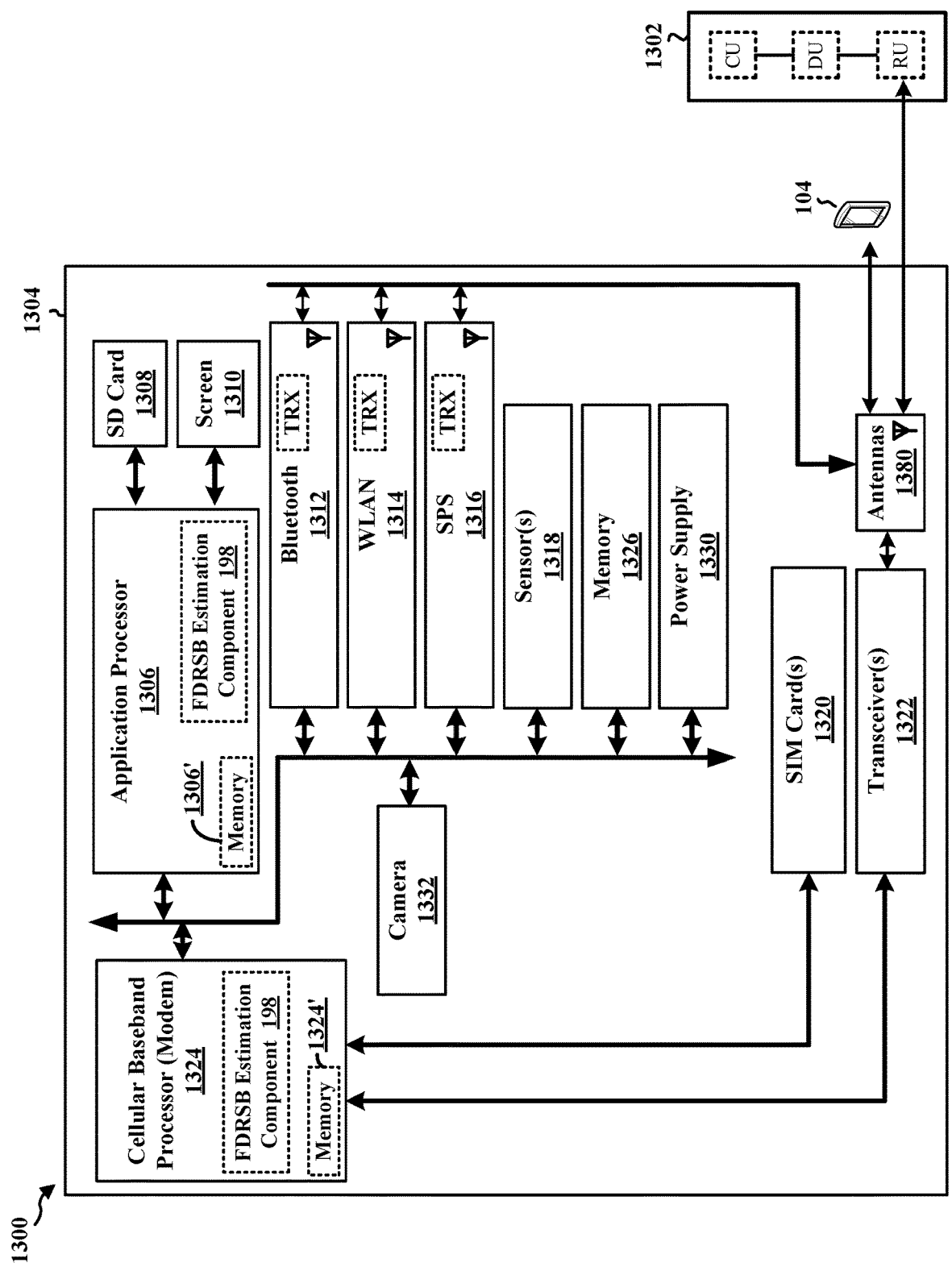
FIG. 13 is a diagram illustrating an example of a hardware implementation for an example apparatus and/or UE.

FIG. 13 is a diagram 1300 illustrating an example of a hardware implementation for an apparatus 1304. The apparatus 1304 may be a UE, a component of a UE, or may implement UE functionality. In some aspects, the apparatus 1204 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see 350 of FIG. 3) and include the additional modules of the apparatus 1304.

As discussed supra, the FDRSB estimation component 198 is configured to receive a training signal from a network node on a plurality of sub-carriers from multiple IQ modulators and multiple RF antenna panels, and transmit a feedback associated with an FDRSB based on the training signal to the network node, where at least one tone of the training signal is received on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal. The FDRSB estimation component 198 may be further configured to perform any of the aspects described in connection with the methods in FIG. 11, FIG. 12, and/or the aspects performed by the UE in the communication flow in FIG. 8. The FDRSB estimation component 198 may be within the cellular baseband processor 1324, the application processor 1306, or both the cellular baseband processor 1324 and the application processor 1306. The FDRSB estimation component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, includes means for transmitting a training signal for a UE on a plurality of sub-carriers, the training signal transmitted via multiple IQ modulators and multiple RF antenna panels, means for receiving a feedback associated with an FDRSB based on the training signal, and means for applying an FDRSB correction filter to at least one signal to be transmitted to the UE, the FDRSB correction filter based on the feedback received from the UE. In one configuration, at least one tone of the training signal is transmitted on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal. In one configuration, the first subset of subcarriers includes even numbered sub-carriers on a first side of the center frequency of the plurality of sub-carriers and odd numbered sub-carriers on a second side of the center frequency of the plurality of sub-carriers. In one configuration, the feedback includes measurements of the training signal over the second subset of sub-carriers. In one configuration, the feedback received from the UE includes an estimation of the FDRSB correction filter measured over the second subset of sub-carriers. In one configuration, the apparatus 1304, and in particular the cellular baseband processor 1324 and/or the application processor 1306, further includes means for estimating the FDRSB correction filter based on the feedback received from the UE. In one configuration, the apparatus 1304, and in particular the cellular baseband processor 1324 and/or the application processor 1306, further includes means for transmitting timing information indicating when the training signal is transmitted for the UE, where the training signal is transmitted with a timing indicated by the timing information. In one configuration, the indication is transmitted at least once in response to a precoder update. In one configuration, the apparatus 1304, and in particular the cellular baseband processor 1324 and/or the application processor 1306, further includes means for transmitting the at least one signal to the UE via the multiple IQ modulators, where the FDRSB correction filter is applied to the at least one signal before the multiple IQ modulators. The apparatus may further include means for performing any of the aspects described in connection with the methods in FIG. 11, FIG. 12, and/or the aspects performed by the UE in the communication flow in FIG. 8. The means may be the FDRSB estimation component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
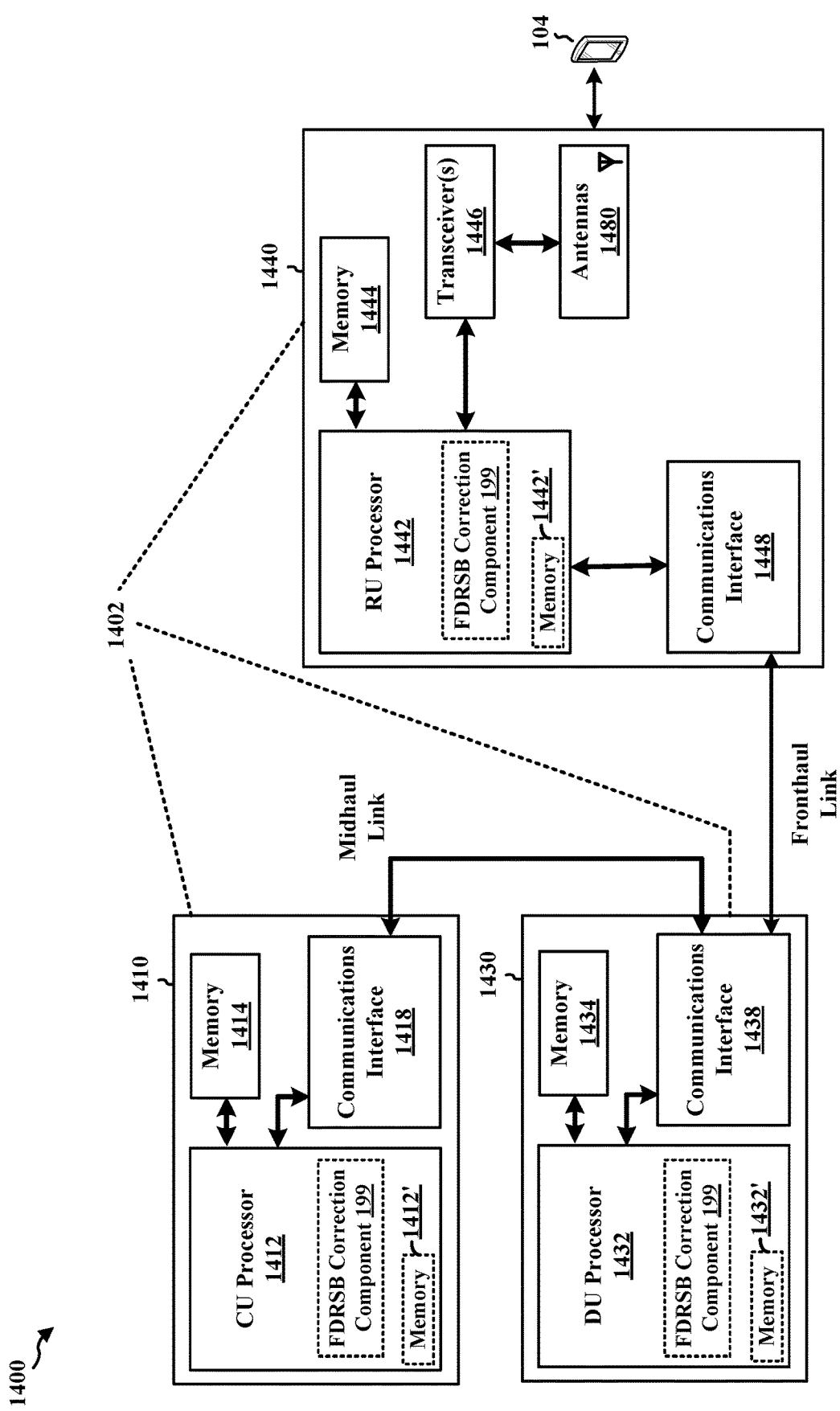
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the FDRSB correction component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the FDRSB correction component 199 is configured to transmit a training signal for a UE on a plurality of sub-carriers, the training signal transmitted via multiple IQ modulators and multiple RF antenna panels, receive a feedback associated with an FDRSB based on the training signal, and apply an FDRSB correction filter to at least one signal to be transmitted to the UE, the FDRSB correction filter based on the feedback received from the UE. The FDRSB correction component 199 may be configured to perform any of the aspects described in connection with the methods in FIG. 9, FIG. 10, and/or the aspects performed by the network node in the communication flow in FIG. 8. The FDRSB correction component 199 may be within one or more processors of one or more of the CU 1410, DU 1430, and the RU 1440. The FDRSB correction component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, In one configuration, the network entity 1402 includes means for receiving a training signal from a network node on a plurality of sub-carriers from multiple IQ modulators and multiple RF antenna panels, and means for transmitting a feedback associated with an FDRSB based on the training signal to the network node, where at least one tone of the training signal is received on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal. In one configuration, the first subset of subcarriers includes even numbered sub-carriers on a first side of the center frequency of the plurality of sub-carriers and odd numbered sub-carriers on a second side of the center frequency of the plurality of sub-carriers. In one configuration, means for estimating an FDRSB correction filter based on measurements of the training signal over the second subset of sub-carriers, where the feedback includes the FDRSB correction filter. In one configuration, the feedback includes measurements of the training signal over the second subset of sub-carriers. In one configuration, the network entity 1402 further includes means for receiving timing information indicating when the training signal is received from the network node, wherein the training signal is received with the timing indicated by the timing information. In one configuration, the indication is received at least once in response to a precoder update. The network entity may include means for performing any of the aspects described in connection with the methods in FIG. 9, FIG. 10, and/or the aspects performed by the network node in the communication flow in FIG. 8. The means may be the FDRSB correction component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network node, including transmitting a training signal for a UE on a plurality of sub-carriers, the training signal transmitted via multiple IQ modulators and multiple RF antenna panels, receiving a feedback associated with an FDRSB based on the training signal, and applying an FDRSB correction filter to at least one signal to be transmitted to the UE, the FDRSB correction filter based on the feedback received from the UE.

Aspect 2 is the method of aspect 1, where at least one tone of the training signal is transmitted on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal.

Aspect 3 is the method of aspect 2, where the first subset of subcarriers includes even numbered sub-carriers on a first side of the center frequency of the plurality of sub-carriers and odd numbered sub-carriers on a second side of the center frequency of the plurality of sub-carriers.

Aspect 4 is the method of any of aspects 2 and 3, where the feedback includes measurements of the training signal over the second subset of sub-carriers.

Aspect 5 is the method of aspect 4, where the feedback received from the UE includes an estimation of the FDRSB correction filter measured over the second subset of sub-carriers.

Aspect 6 is the method of any of aspects 4 and 5, further including estimating the FDRSB correction filter based on the feedback received from the UE.

Aspect 7 is the method of any of aspects 1 to 6, further including transmitting timing information indicating when the training signal is transmitted for the UE, where the training signal is transmitted with a timing indicated by the timing information.

Aspect 8 is the method of aspect 7, where the indication is transmitted at least once in response to a precoder update.

Aspect 9 is the method of any of aspects 1 to 8, further including transmitting the at least one signal to the UE via the multiple IQ modulators, where the FDRSB correction filter is applied to the at least one signal before the multiple IQ modulators.

Aspect 10 is an apparatus for wireless communication including at least one processor coupled to a memory and configured to implement any of aspects 1 to 9, further including a transceiver coupled to the at least one processor.

Aspect 11 is an apparatus for wireless communication including means for implementing any of aspects 1 to 9.

Aspect 12 is a non-transitory computer-readable medium storing computer executable code, where the code when executed by a processor causes the processor to implement any of aspects 1 to 9.

Aspect 13 is a method of wireless communication at a UE, including receiving a training signal from a network node on a plurality of sub-carriers from multiple IQ modulators and multiple RF antenna panels, and transmitting a feedback associated with an FDRSB based on the training signal to the network node, where at least one tone of the training signal is received on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal.

Aspect 14 is the method of aspect 13, where the first subset of subcarriers includes even numbered sub-carriers on a first side of the center frequency of the plurality of sub-carriers and odd numbered sub-carriers on a second side of the center frequency of the plurality of sub-carriers.

Aspect 15 is the method of any of aspects 13 and 14, further including estimating an FDRSB correction filter based on measurements of the training signal over the second subset of sub-carriers, where the feedback includes the FDRSB correction filter.

Aspect 16 is the method of any of aspects 13 to 15, where the feedback includes measurements of the training signal over the second subset of sub-carriers.

Aspect 17 is the method of any of aspects 13 to 16, further including receiving timing information indicating when the training signal is received from the network node, wherein the training signal is received with the timing indicated by the timing information.

Aspect 18 is the method of aspect 17, where the indication is received at least once in response to a precoder update.

Aspect 19 is an apparatus for wireless communication including at least one processor coupled to a memory and configured to implement any of aspects 13 to 18, further including a transceiver coupled to the at least one processor.

Aspect 20 is an apparatus for wireless communication including means for implementing any of aspects 13 to 18.

Aspect 21 is a non-transitory computer-readable medium storing computer executable code, where the code when executed by a processor causes the processor to implement any of aspects 13 to 18.

What is claimed is:

1. An apparatus for wireless communication at a network node, comprising:
a memory; and
at least one processor coupled to the memory and, based at least in part on information stored in the memory, the at least one processor is configured to:
transmit a training signal for a user equipment (UE) on a plurality of sub-carriers, the training signal transmitted via multiple in-phase (I) and quadrature (Q) (IQ) modulators and multiple radio frequency (RF) antenna panels;
receive a feedback associated with a frequency dependent residual side band (FDRSB) based on the training signal; and
apply an FDRSB correction filter to at least one signal to be transmitted to the UE, the FDRSB correction filter based on the feedback received from the UE.

2. The apparatus of claim 1, further comprising a transceiver coupled to the at least one processor,
wherein the at least one processor is configured to transmit at least one tone of the training signal on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal.

3. The apparatus of claim 2, wherein the first subset of subcarriers includes even numbered sub-carriers on a first side of the center frequency of the plurality of sub-carriers and odd numbered sub-carriers on a second side of the center frequency of the plurality of sub-carriers.

4. The apparatus of claim 2, wherein the feedback includes measurements of the training signal over the second subset of sub-carriers.

5. The apparatus of claim 4, wherein the feedback from the UE includes an estimation of the FDRSB correction filter measured over the second subset of sub-carriers.

6. The apparatus of claim 4, wherein the at least one processor is further configured to:
estimate the FDRSB correction filter based on the feedback received from the UE.

7. The apparatus of claim 1, wherein the at least one processor is further configured to:
transmit timing information indicating when the training signal is transmitted for the UE,
wherein the at least one processor is configured to transmit the training signal with a timing indicated by the timing information.

8. The apparatus of claim 7, wherein the at least one processor is configured to transmit the timing information at least once in response to a precoder update.

9. The apparatus of claim 1, wherein the at least one processor is further configured to:
transmit the at least one signal to the UE via the multiple IQ modulators,
wherein the FDRSB correction filter is applied to the at least one signal before the multiple IQ modulators.

10. An apparatus for wireless communication at a user equipment (UE), comprising:
a memory; and
at least one processor coupled to the memory and, based at least in part on information stored in the memory, the at least one processor is configured to:
receive a training signal from a network node on a plurality of sub-carriers from multiple in-phase (I) and quadrature (Q) (IQ) modulators and multiple radio frequency (RF) antenna panels; and
transmit a feedback associated with a frequency dependent residual side band (FDRSB) based on the training signal to the network node,
wherein the at least one processor is configured to receive at least one tone of the training signal on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal.

11. The apparatus of claim 10, further comprising a transceiver coupled to the at least one processor,
wherein the first subset of subcarriers includes even numbered sub-carriers on a first side of the center frequency of the plurality of sub-carriers and odd numbered sub-carriers on a second side of the center frequency of the plurality of sub-carriers.

12. The apparatus of claim 10, wherein the at least one processor is further configured to:
estimate an FDRSB correction filter based on measurements of the training signal over the second subset of sub-carriers,
wherein the feedback includes the FDRSB correction filter.

13. The apparatus of claim 10, wherein the feedback includes measurements of the training signal over the second subset of sub-carriers.

14. The apparatus of claim 10, wherein the at least one processor is further configured to:

receive timing information indicating when the training signal is received from the network node,
wherein reception of the training signal is based on a timing indicated by the timing information.

15. The apparatus of claim 14, wherein the at least one processor is configured to receive the timing information at least once in response to a precoder update.

16. A method of wireless communication at a network node, comprising:
transmitting a training signal for a user equipment (UE) on a plurality of sub-carriers, the training signal transmitted via multiple in-phase (I) and quadrature (Q) (IQ) modulators and multiple radio frequency (RF) antenna panels;
receiving a feedback associated with a frequency dependent residual side band (FDRSB) based on the training signal; and
applying an FDRSB correction filter to at least one signal to be transmitted to the UE, the FDRSB correction filter based on the feedback received from the UE.

17. The method of claim 16, wherein at least one tone of the training signal is transmitted on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal.

18. The method of claim 17, wherein the first subset of subcarriers includes even numbered sub-carriers on a first side of the center frequency of the plurality of sub-carriers and odd numbered sub-carriers on a second side of the center frequency of the plurality of sub-carriers.

19. The method of claim 17, wherein the feedback includes measurements of the training signal over the second subset of sub-carriers.

20. The method of claim 19, wherein the feedback received from the UE includes an estimation of the FDRSB correction filter measured over the second subset of sub-carriers.

21. The method of claim 19, further comprising:
estimating the FDRSB correction filter based on the feedback received from the UE.

22. The method of claim 16, further comprising:
transmitting timing information indicating when the training signal is transmitted for the UE,
wherein the training signal is transmitted with a timing indicated by the timing information.

23. The method of claim 22, wherein the timing information is transmitted at least once in response to a precoder update.

24. The method of claim 16, further comprising:
transmitting the at least one signal to the UE via the multiple IQ modulators,
wherein the FDRSB correction filter is applied to the at least one signal before the multiple IQ modulators.

25. A method for wireless communication at a user equipment (UE), comprising:
receiving a training signal from a network node on a plurality of sub-carriers from multiple in-phase (I) and quadrature (Q) (IQ) modulators and multiple radio frequency (RF) antenna panels; and
transmitting a feedback associated with a frequency dependent residual side band (FDRSB) based on the training signal to the network node,
wherein at least one tone of the training signal is received on a first subset of sub-carriers of the plurality of sub-carriers, the first subset of sub-carriers being configured symmetric to a second subset of sub-carriers with respect to a center frequency of the plurality of sub-carriers, and the second subset of sub-carriers being free of the at least one tone of the training signal.

26. The method of claim 25, wherein the first subset of subcarriers includes even numbered sub-carriers on a first side of the center frequency of the plurality of sub-carriers and odd numbered sub-carriers on a second side of the center frequency of the plurality of sub-carriers.

27. The method of claim 25, further comprising:

estimating an FDRSB correction filter based on measurements of the training signal over the second subset of sub-carriers, wherein the feedback includes the FDRSB correction filter.

28. The method of claim 25, wherein the feedback includes measurements of the training signal over the second subset of sub-carriers.

29. The method of claim 25, further comprising:

receiving timing information indicating when the training signal is received from the network node, wherein the training signal is received with a timing indicated by the timing information.

30. The method of claim 29, wherein the timing information is received at least once in response to a precoder update.

* * * * *